US007120592B1

(12) United States Patent  
Lewis

(10) Patent No.: US 7,120,592 B1  
(45) Date of Patent: Oct. 10, 2006

(54) METHOD, APPARATUS AND PROCESSED FOR REAL TIME INTERACTIVE ONLINE ORDERING AND REORDERING AND OVER THE COUNTER PURCHASING WITH REBATE, SAVING, AND INVESTING PROCESSES

(76) Inventor: Morris Edward Lewis, 6104 Joyce Dr., Camp Springs, MD (US) 20748

(*) Notice: Subject to any disclaimer, the term of this patent is extended or adjusted under 35 U.S.C. 154(b) by 0 days.

(21) Appl. No.: 09/339,059

(22) Filed: Jun. 23, 1999

Related U.S. Application Data

(60) Provisional application No. 60/133,532, filed on May 10, 1999, provisional application No. 60/090,698, filed on Jun. 24, 1998.

(51) Int. Cl.  
*G06Q 30/00* (2006.01)  
*G06Q 20/00* (2006.01)

(52) U.S. Cl. ..................................................... 705/26
(58) Field of Classification Search .................. 705/21, 705/26, 27; 725/42  
See application file for complete search history.

(56) References Cited

U.S. PATENT DOCUMENTS

| | | | | | |
|---|---|---|---|---|---|
| 5,053,956 | A | * | 10/1991 | Donald et al. ............... | 713/601 |
| 5,113,496 | A | * | 5/1992 | McCalley et al. ........... | 710/305 |
| 5,191,410 | A | * | 3/1993 | McCalley et al. ........... | 725/114 |
| 5,195,092 | A | * | 3/1993 | Wilson et al. ............... | 725/146 |
| 5,426,282 | A | * | 6/1995 | Humble ....................... | 235/383 |
| 5,699,526 | A | * | 12/1997 | Siefert ......................... | 705/27 |
| 5,721,832 | A | * | 2/1998 | Westrope et al. ............ | 705/27 |
| 5,736,977 | A | * | 4/1998 | Hughes ........................ | 345/716 |
| 5,737,592 | A | | 4/1998 | Nguyen et al. | |
| 5,759,101 | A | * | 6/1998 | Von Kohorn ................ | 463/40 |
| 5,784,546 | A | * | 7/1998 | Benman, Jr. ................. | 707/500.1 |
| 5,793,967 | A | * | 8/1998 | Simciak et al. ............. | 709/204 |
| 5,848,399 | A | * | 12/1998 | Burke .......................... | 705/27 |
| 5,886,898 | A | * | 3/1999 | Choudhury et al. ........ | 700/218 |
| 5,913,210 | A | * | 6/1999 | Call ............................. | 707/4 |
| 5,917,810 | A | * | 6/1999 | De Bot ....................... | 370/294 |
| 5,930,769 | A | * | 7/1999 | Rose ............................ | 705/27 |
| 5,938,727 | A | * | 8/1999 | Ikeda .......................... | 709/218 |
| 5,963,134 | A | | 10/1999 | Bowers et al. | |
| 5,978,773 | A | * | 11/1999 | Hudetz et al. ............... | 705/23 |
| 5,991,736 | A | * | 11/1999 | Ferguson et al. ............ | 705/14 |

(Continued)

FOREIGN PATENT DOCUMENTS

JP 10-228506 A * 8/1998

(Continued)

OTHER PUBLICATIONS

Anon. "Times Mirror and NYNEX in Venture," New York Times, Wednesday, May 4, 1994, Section D, p. 1, col. 6.*

(Continued)

*Primary Examiner*—Nicholas D. Rosen

(57) ABSTRACT

The Invention encompasses a system comprising a novel Volume Purchase Rebate Business Method, Volume Purchase Rebate Appliance sub-system, Volume Purchase Rebate Online-Interactive Showroom sub-system, Volume Purchase Rebate Online-Interactive Showcase sub-system, Volume Purchase Rebate Online-Interactive SalesPerson sub-system and Online-Interactive Ordering or Online-Interactive Re-Ordering sub-systems, and methods and processes for purchasing or volume purchasing or excess inventory purchasing or excess capacity purchasing for a plurality of purchasers who are in fact group purchasing yet purchasing individually from merchants for goods, products and services and obtaining and investing rebates while purchasing over the counter or real-time interactive online direct ordering and automatic re-ordering of said goods and services.

31 Claims, 18 Drawing Sheets

REMOTE OPERATED ONLINE PRODUCT DEMO SYSTEM (CyberShowcase)

U.S. PATENT DOCUMENTS

| | | | |
|---|---|---|---|
| 6,026,376 A * | 2/2000 | Kenney | 705/27 |
| 6,029,143 A * | 2/2000 | Mosher et al. | 705/28 |
| 6,032,129 A * | 2/2000 | Greef et al. | 705/27 |
| 6,032,130 A * | 2/2000 | Alloul et al. | 705/27 |
| 6,035,283 A * | 3/2000 | Rofrano | 705/27 |
| 6,037,936 A * | 3/2000 | Ellenby et al. | 345/764 |
| 6,044,403 A * | 3/2000 | Gerszberg et al. | 709/225 |
| 6,083,267 A * | 7/2000 | Motomiya et al. | 703/6 |
| 6,088,682 A * | 7/2000 | Burke | 705/17 |
| 6,108,789 A | 8/2000 | Dancs | |
| 6,125,352 A * | 9/2000 | Franklin et al. | 705/26 |
| 6,134,548 A * | 10/2000 | Gottsman et al. | 707/5 |
| 6,199,044 B1 | 3/2001 | Ackley et al. | |
| 6,199,048 B1 * | 3/2001 | Hudetz et al. | 705/23 |
| 6,282,714 B1 | 8/2001 | Ghori et al. | |
| 6,323,894 B1 * | 11/2001 | Katz | 348/14.08 |
| 6,331,858 B1 * | 12/2001 | Fisher | 345/582 |

FOREIGN PATENT DOCUMENTS

| | | |
|---|---|---|
| WO | WO 98-13770 A1 * | 4/1998 |
| WO | WO 01/09748 A2 * | 2/2001 |

OTHER PUBLICATIONS

Anon. "US West Introduces Interactive TV Shopping Service," Yellow Pages and Directory Report, vol. 10, No. 14, Aug. 24, 1994.*

Anon., "New OLiVR Server Component Accelerates Net Commerce Market with Streamed, Interactive Pictures and Measurement System," Business Wire, p. 12040015, Dec. 4, 1996.*

The Microsoft Press Computer Dictionary, Third Edition, Microsoft Press, 1997, pp. 68, 239, 393, 405, and 430.*

Anon., "Pi Graphix Defines Its Role as an Innovative Leader in the Burgeoning Electronic Commerce Marketplace," Business Wire, p. 9160127, Sep. 16, 1997.*

Japanese Patent Office Website, incomplete and unofficial computer translation of Japanese Patent Document 10-228506-A, t Kujirada, translation performed Apr. 2002.*

U.S. Appl. No. 60/065,233, filed Nov. 13, 1997, Lewis.

U.S. Appl. No. 09/190,152, filed Nov. 12, 1998, Lewis.

* cited by examiner

FIG. 4  Methods for the Re-Ordering Module to Interface with the 100

FIG. 9 World Wholesalers Concept (Buyers World)

FIG. 10 World Mall Concept (Shoppers World)

CyberShowRoom (Entrance View)

FIG. 13  REMOTE OPERATED ONLINE PRODUCT DEMO SYSTEM (CyberShowcase)

Internet Purchasing and Distribution Cycle

**Commercial Purchaser
Internet Purchasing and Distribution Cycle**

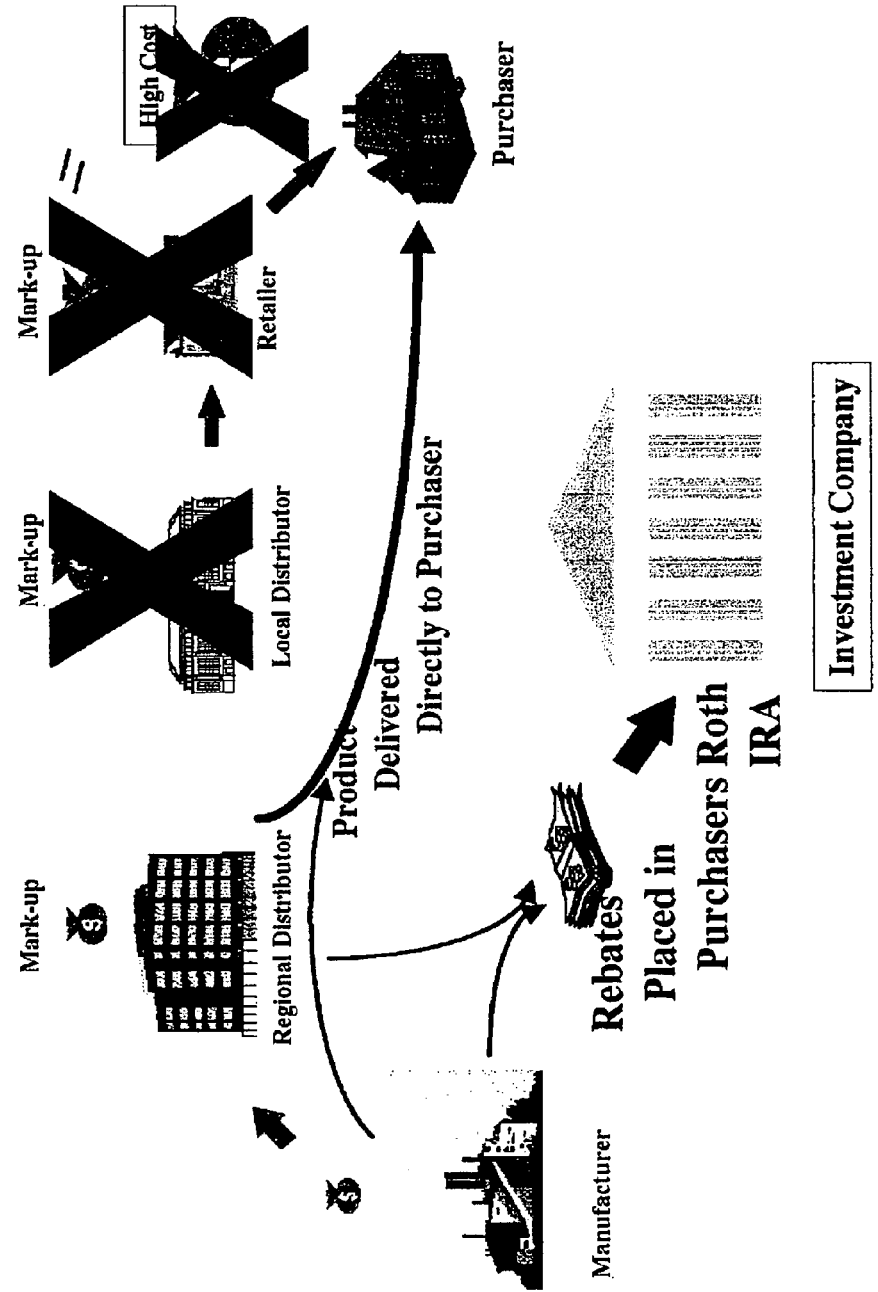
FIG. 17 We Eliminate Mark-up and Add Rebates

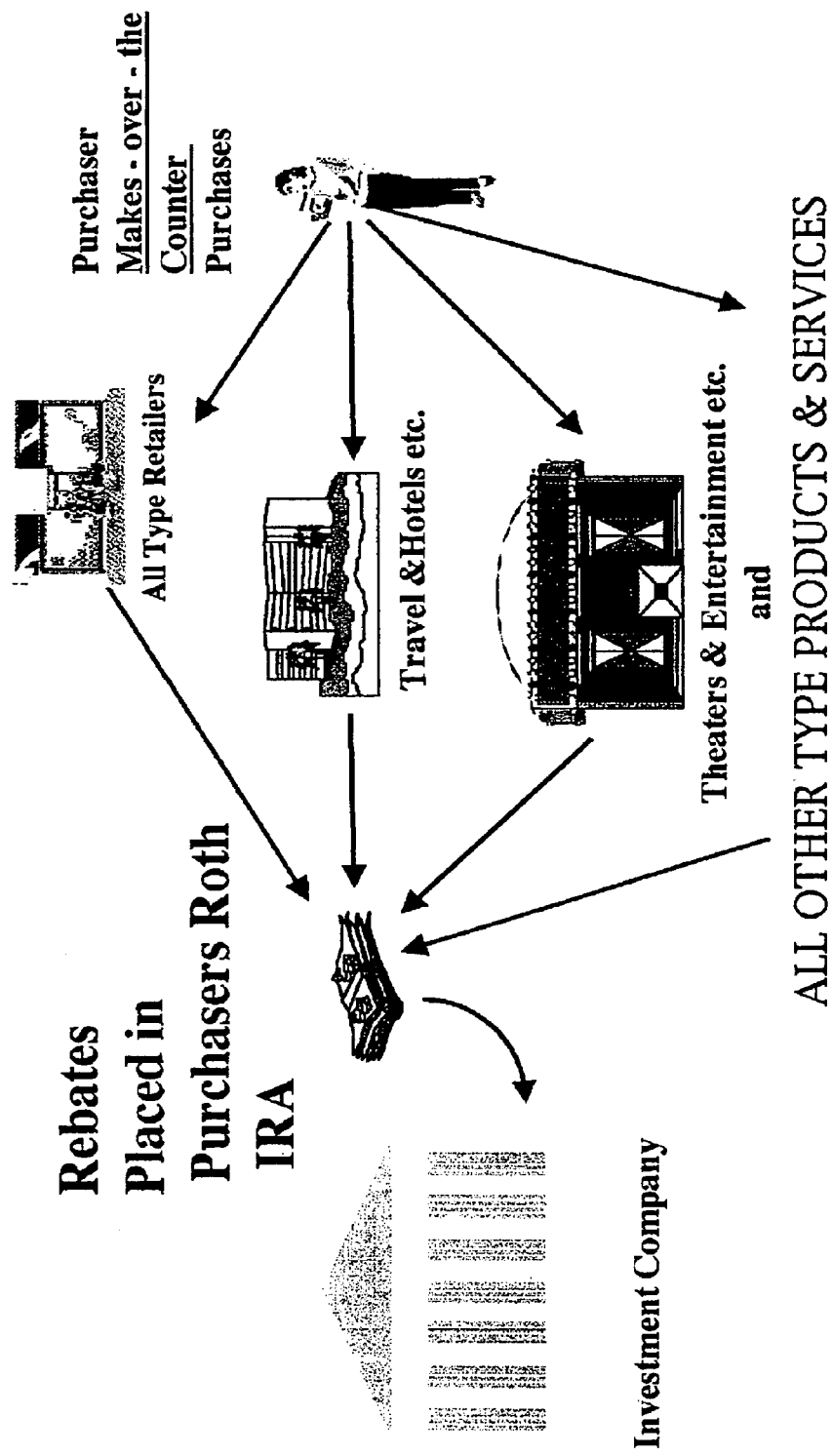
FIG. 18 Over-The Counter- Purchasing and Rebates

METHOD, APPARATUS AND PROCESSED FOR REAL TIME INTERACTIVE ONLINE ORDERING AND REORDERING AND OVER THE COUNTER PURCHASING WITH REBATE, SAVING, AND INVESTING PROCESSES

I hereby claim the priority benefit of provisional applications 60/090,698, filed Jun. 24, 1998, and 60/133,532, filed May 10, 1999.

BACKGROUND OF THE INVENTION a) Field of Invention

This invention relates to a system comprising a novel Volume Purchase Rebate Business Method, Volume Purchase Rebate Appliance sub-system, Volume Purchase Rebate Online-Interactive Showroom sub-system, Volume Purchase Rebate Online-Interactive Showcase sub-system, Volume Purchase Rebate Online-Interactive SalesPerson subsystem and Online-Interactive Ordering or Online-Interactive Re-Ordering sub-system and methods and processes for operating this system. The system is used for purchasing or volume purchasing or excess inventory purchasing or excess capacity purchasing for a plurality of purchasers who are in fact group purchasing yet purchasing individually from merchants for goods, products or services and who obtain rebates which are invested. The system is further used while real-time interactive online direct ordering and automatic reordering of said goods or services by way of real-time interactive online transactions in showrooms (CyberShowRooms) and showcases (CyberShowCases) and while directly communicating with the servicing salesperson (CyberSalesPersons). The present invention also encompasses means for interfacing with wholesaler warehousing and distribution systems. The purpose for the present invention is to bring forth a means for an extremely unique purchasing experience whereby individual consumers and individual merchants can purchase all types of goods and services and take advantage of the savings brought about by volume purchasing of these goods, products and services. It is further envisioned that the savings realized by volume purchasing will be placed in consumer's retirement investing accounts thereby giving the consumer added funds for retirement and other purposes. The present invention solves these problems.

Rebates, Saving and Investing:

The Need For Action. American workers generally need three elements to ensure financial security in retirement: (1) Social Security; (2) an employer-provided pension plan; and (3) personal retirement savings. Currently, Social Security is the sole source of income for 18 percent of all elderly Americans, and the primary source for two-thirds of all senior citizens. For over five years, the President has worked with Congress to expand pension coverage, make pensions more secure, and simplify pension plan administration. Despite these achievements, the personal savings rate among Americans remains too low, and many workers do not have pension coverage through their employers. Research shows that:

More than 50 million employees—half of All-American workers, are not covered by a pension plan;

Only 35 percent of private sector workers under age 25 are covered by a pension plan;

Only 21 percent of private sector workers earning under $35,000 a year are covered by a pension plan;

Only 24 percent of full-time workers in firms with fewer than 100 employees are covered by a pension plan b) Description of the Related Art I could find no prior art relating to a system comprising a novel Volume Purchase Rebate Business Method, Volume Purchase Rebate Appliance subsystem, Volume Purchase Rebate Online-Interactive Showroom sub-system, Volume Purchase Rebate Online-Interactive Showcase sub-system, and Volume Purchase Rebate Online-Interactive SalesPerson subsystem and Online-Interactive Ordering or Online-Interactive Re-Ordering sub-system methods and processes for operating this system. Nor, could I find prior art for purchasing or volume purchasing or excess inventory purchasing or excess capacity purchasing for a plurality of purchasers who are in fact group purchasing yet purchasing individually from merchants for goods, products or services and who obtain rebates which are invested while real-time interactive online direct ordering and automatic re-ordering of said goods or services by way of real-time interactive online showrooms (CyberShowRooms) and showcases (CyberShowCases) and directly communicating with the servicing salesperson (CyberSalesPersons)

BRIEF SUMMARY OF THE INVENTION

The Invention encompasses technology that relates to a system comprising a novel Volume Purchase Rebate Business Method, Volume Purchase Rebate Appliance sub-system, Volume Purchase Rebate Online-Interactive Showroom sub-system, Volume Purchase Rebate Online-Interactive Showcase sub-system, Volume Purchase Rebate Online-Interactive SalesPerson sub-system and Online-Interactive Ordering or Online-Interactive Re-Ordering sub-system and methods and processes for operating this system. The system will greatly facilitate the sale of goods and services while providing customers with a means to painlessly funding their Individual Retirement Accounts. While doing so, the present invention provides a novel volume purchasing and rebate business method sub-system having a volume purchasing rebate that addresses a purchaser's long term need to provide for his retirement security. In accordance with the principles of the present invention, a volume purchasing and rebate system is disclosed in which a monetary volume purchasing rebate for volume purchasing or purchasing of excess inventory and capacity is transferred to the purchaser's retirement account. The volume purchasing and rebate system of the present invention thereby provides the purchaser with volume purchasing rebate for volume purchasing goods and services and purchasing excess inventory and capacity that addresses the purchaser's long-term need of providing for his retirement security.

It is another primary object of the present invention to provide technology that will greatly facilitate the volume purchase and sale of goods and services and to provide a means for real-time interactive online ordering and the reordering of said goods and services while also providing customers with a means to painlessly fund their Individual Retirement Accounts.

The present invention also provides a method for purchasing goods, products or services and obtain and invest rebates using a plurality of purchasers who have an option of volume purchasing and obtaining rebates and/or purchasing excess inventory and obtaining rebates. This option derives from many factors to include, consultation with the Certified Purchasing Planner (CPP), or as a result of a decision based upon researching volume purchasing and excess inventory or capacity purchasing opportunities and options with the ordering or control monitoring unit and the purchasing facilitation systems unit (VPR Appliance or On-site Computer) of the present invention. Volume purchasing or excess inventory or capacity purchasing opportunities and options can also be downloaded to the purchaser based upon the purchasers past purchasing trends and desires. The reordering reader or the opening station can be used for reordering of goods, products or services Purchasers will use various purchasing cards to include VPR credit cards, VPR debit cards, VPR smart cards or any other type card suitable for present invention purchasing. Input devices such as card reader, and terminal, interfacing with the VPR Appliance or On-site Computer, which can allow said VPR credit cards, VPR debit cards, VPR smart cards or any other type card pay for the selected goods, products or service and facilitate rebates for the purchasers investment account.

Another segment of the present invention brings forth a means for the VPR Appliance or On-site Computer generally to interfaces with ShowRooms, ShowCases containing or Salespersons systems and using remote means to for the VPR Appliance or On-site Computer to control closed-circuit television purchasing systems using either cameras in a fixed location or cameras that are mounted for movement along a track, dome or stand to provide automatic acquisition of a product object in response to an command signal or the like.

The present invention also includes methods of simulating the motion of real-time shopping through the VPR Appliance or On-site Computer controlling the use of pan, tilt and zoom cameras, which enhance product presentation through motion etc. In the case of an operator-attended purchasing system, the human operator may attempt to respond to the command signal by operating system controls to reposition the camera carnage and to adjust the camera direction, etc. so that an image of the product is obtained.

The present invention also includes means and methods whereby shoppers/buyers use the VPR Appliance or On-site Computer to virtually shop at regional as well as international establishments without leaving the comfort of their homes and businesses. However, purchased products are pre-positioned at strategic locations to speed up delivery to the purchaser etc.

This segment of the present invention also interfaces with the VPR Appliance or On-site Computer and relates to a new and improved merchant's CyberShowCase which has for its principal purpose to provide a moving and adjustable CCTV system for motorized revolving platform and hanger systems on which the product to be pictured rests and also for a multi-colored backdrop system which is positioned behind the product in the line of sight of the camera. The multi-colored backdrop is preferably illuminated from behind with rear view projection or from the front with either a white light or a light having appropriate color filter. The projectioned or multi-colored backdrop provides a wide variety of scenes as background for the product being photographed.

This apparatus also encompasses means and methods of giving the presented product motion through the use of pan-tilt-zoom cameras and moving platforms and racks located in the CyberShowCase. Not only do these devices provide motion, but they also present multiple viewing angles to make product presentation more appealing.

The CyberShowCase may be used either as a stationary or mobile showcase. Accordingly, it is a principal product of the present invention to provide an equipment bay on wheels, which contains the equipment and systems to facilitate CCTV production.

Another feature of the Cybershowcase is the fact it is readily transportable, easily adjustable in many different positions and adaptable to a wide variety of conditions to photography products.

The present invention further encompasses means and methods of simulating the shopper actually being in the showroom with a salesperson known as a CyberSalesPerson showing the product. The CyberSalesPerson is equipped with the means to effectively communicate (audio and video) online real-time with the shopper (retail customer) or buyer (wholesale customer) being serviced. These systems interface with the VPR Appliance or On-site Computer.

BRIEF DESCRIPTION OF THE DRAWINGS

FIG. 18 Illustrates Over-The-Counter Purchasing and Rebates

DESCRIPTION OF THE PREFERRED EMBODIMENT

Figure 1:
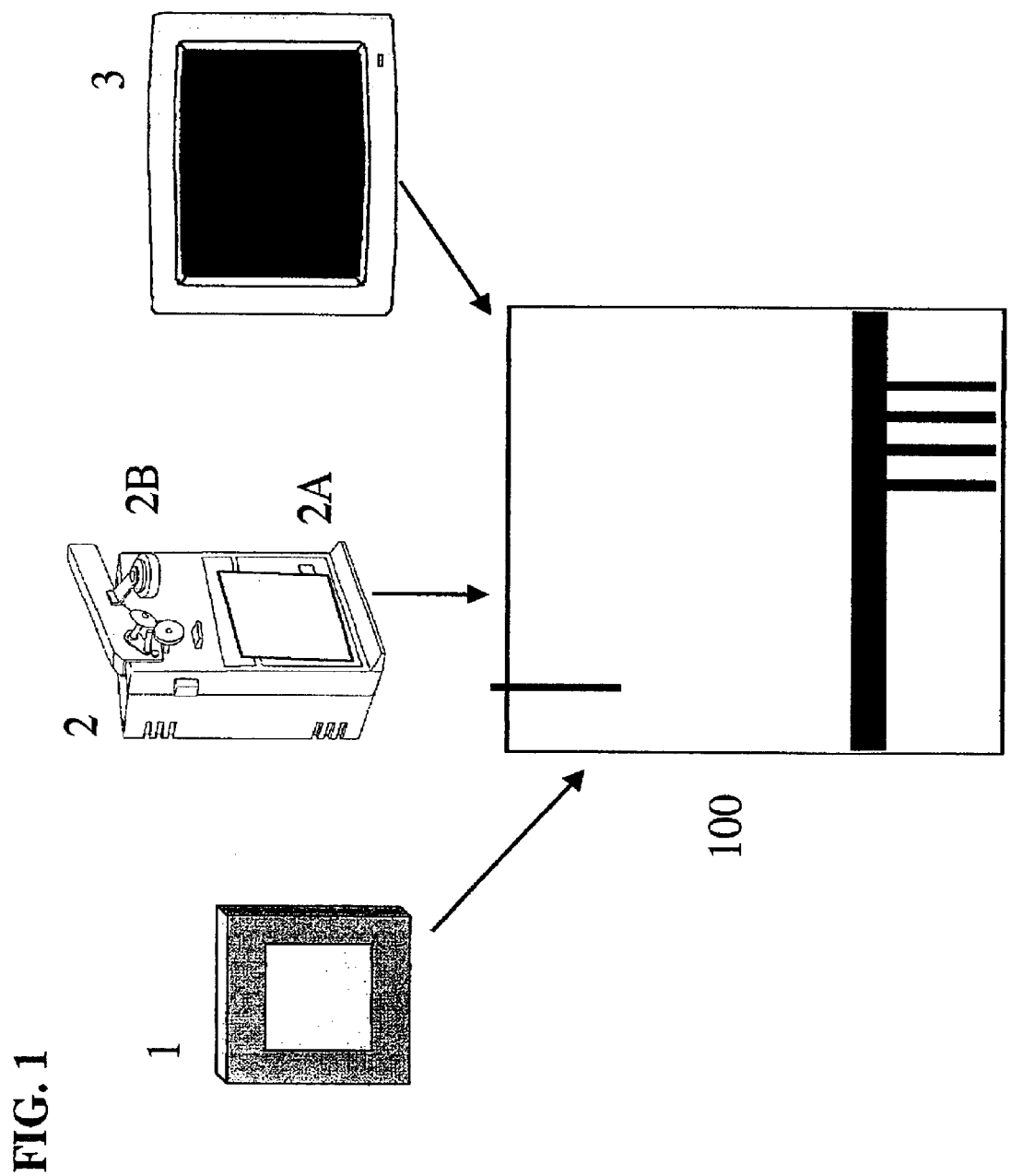
FIG. 1 Illustrates the modular structure of the Real-time interactive online product and services ordering and re-ordering system.

For the purposes of promoting an understanding of the principles of the invention, references will now be made to the embodiment illustrated in the drawings and specific language will be used to describe the same. It will nevertheless be understood that no limitation of the scope of the invention is thereby intended Any alteration and further modification in the described embodiment, and any further applications of the principles of the invention as described herein are contemplated as would normally occur to one skilled in the art to which the invention relates.

FIG. 1 Illustrates the modular structure of the Real-time interactive online product and services ordering and re-ordering sub-system in accordance with the present invention. The diagram shows a remote re-ordering subsystem 1, a product opening/unsealing station with a ordering sub-system 2, with a barcode type reader 2A, and a RF type reader 2B, a monitor 3(touch screen or regular) and a VPR Appliance 100.

Figure 2:
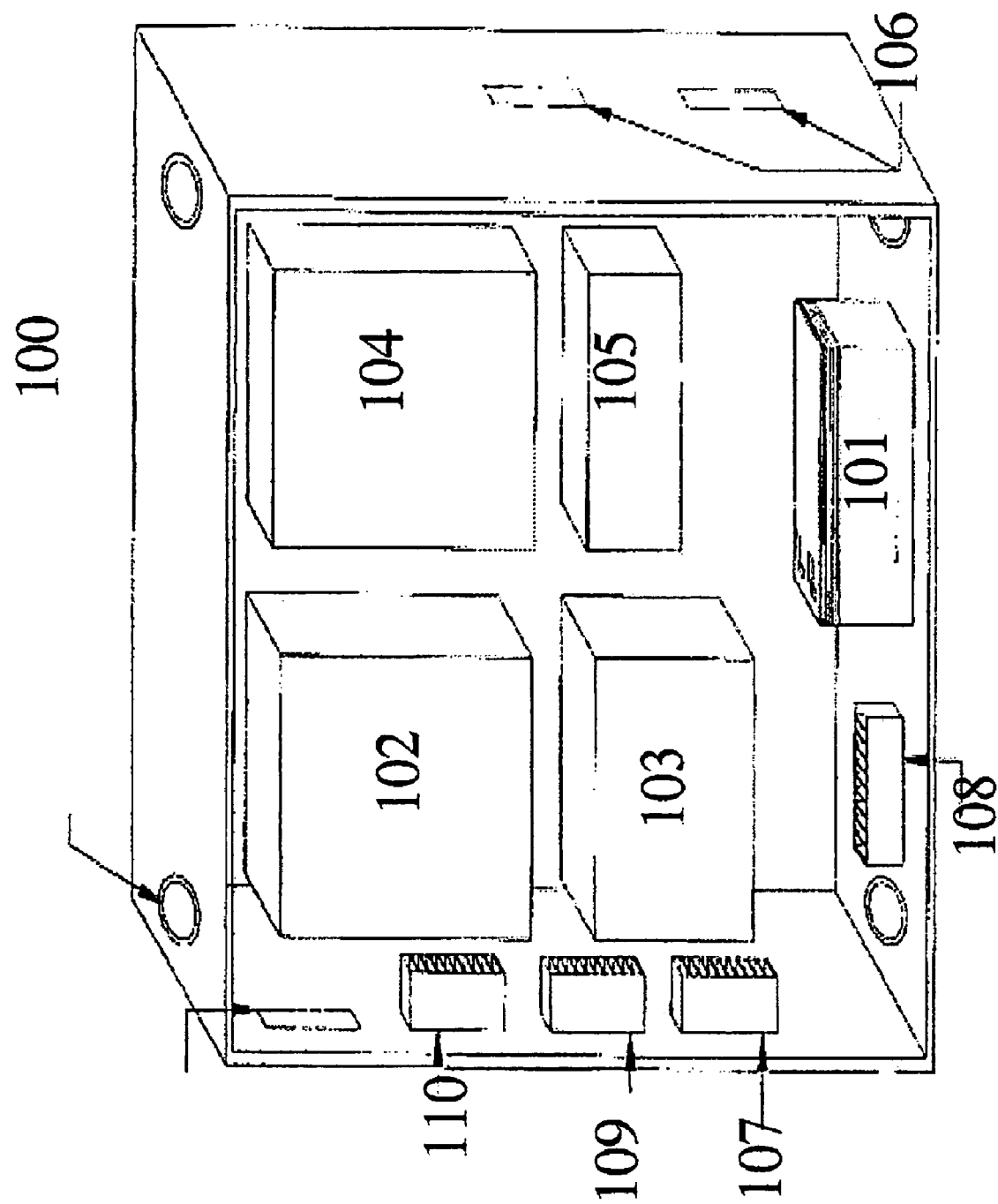
FIG. 2 Illustrates the Real-time interactive online Volume Purchase Rebate Appliance.

FIG. 2 Illustrates the Real-time interactive online Volume Purchase Rebate Appliance;

The VPR Appliance 100 or On-site Computer 3A consist of the main computer/server with recording systems module 102 the monitoring, metering etc., microprocessor and universal bar-code ROM microprocessor systems module 104, the control/relay module 105, the microprocessor bus 106, the computer/server bus 110, the control/relay bus 107, the power bus 108, and the aux. battery 101.

Figure 3:
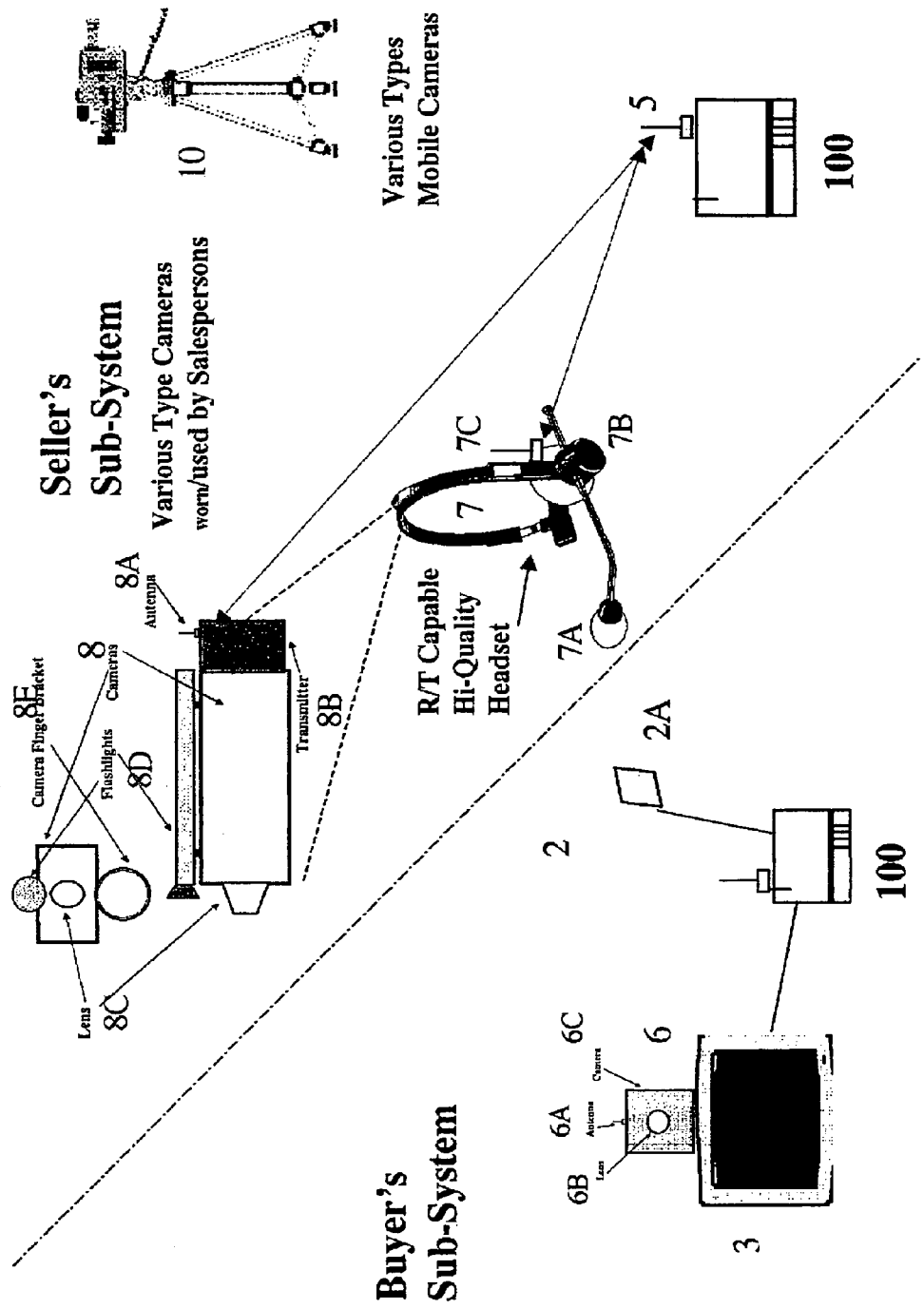
FIG. 3 Illustrates Online Buyer's and Seller's (CyberSalesPerson) Sub-Systems.

FIG. 3 Illustrates Online Buyer's and Seller's (CyberSalesPerson) Sub-Systems; The Buyers Sub-System includes a product opening/unsealing station with a ordering sub-system 2, with a barcode type reader 2A, and a RF type reader 2B, a camera system 6 with microphone 6C and video display monitor 3 interfaced with the VPR Appliance 100 or On-site Computer 3A that communicates 5 & 6A by wireless, online or otherwise with the Seller Sub-System (which includes various cameras such as; a finger bracket camera 8–8E, eyeglass, cap, beeper etc. covert cameras 9A and various other camera systems which are mounted on tripods 10, or any other type stand or mount) the CyberShowCase and the CyberShowRoom systems. The CyberSalesPerson is also equipped with a R/T capable Headset 7, that has a microphone 7A, earphones 7B and mini-radio unit w/ antenna 7C.

Figure 4:
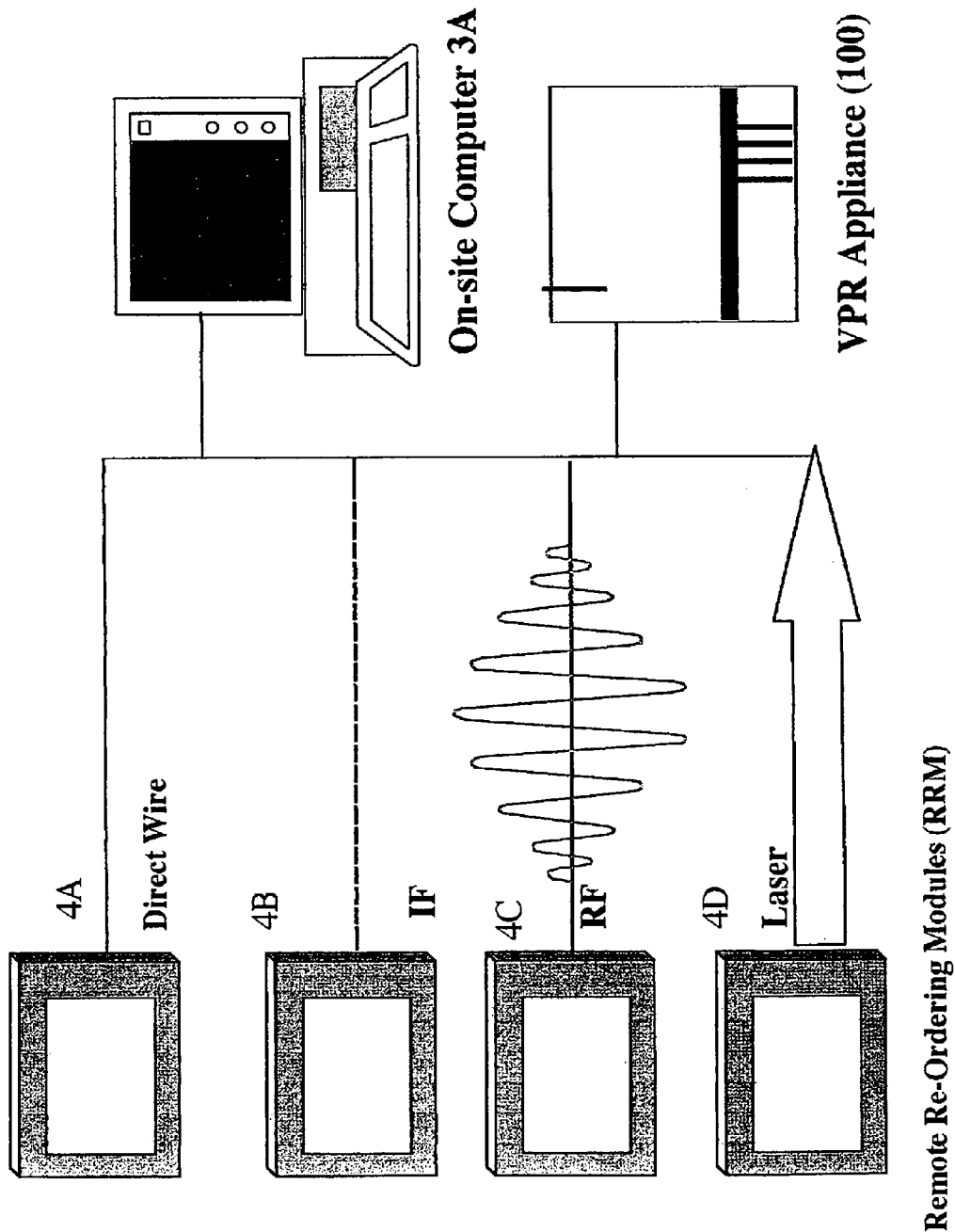
FIG. 4 Illustrates the Real-time interactive online product and services re-ordering subsystems.

FIG. 4 Illustrates the Real-time interactive online product and services reordering sub-systems; These sub-systems 1, interface with a VPR Appliance 100 or On-site Computer 3A by way of direct wire 4A, Infrared frequency signal 4B, RF Signal 4C and Laser Signal 4D to the VPR Appliance or On-site Computer communication bus 4K, whereby signals are processed in the communications module 4G.

Figure 5:
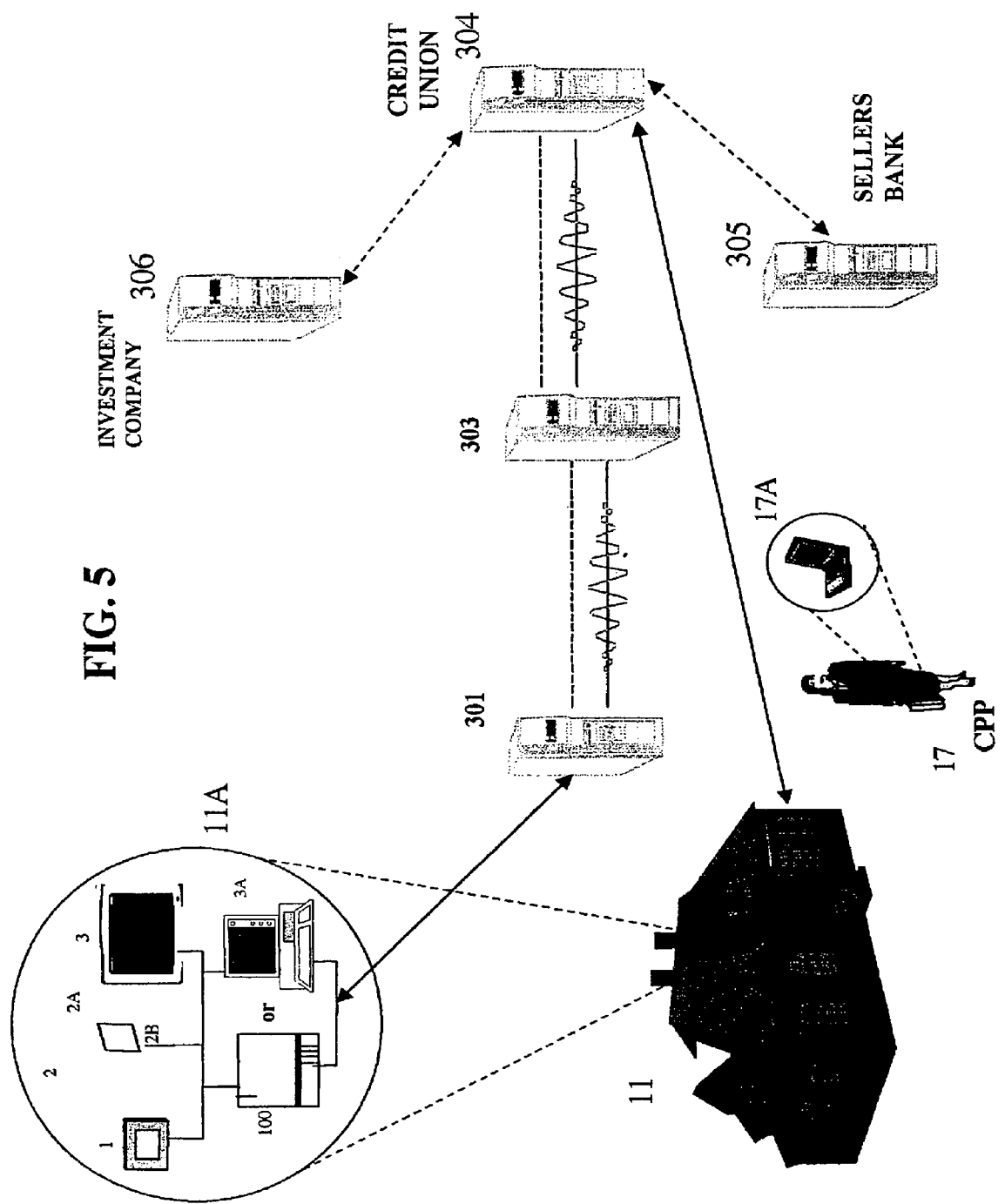
FIG. 5 Illustrates a systems diagram showing the Real-time interactive online product and services ordering re-ordering sub systems and VPR Appliance or On-site Computer, which are located in Homes.

FIG. 5 Illustrates a systems diagram showing the Real-time interactive online product and services ordering re-ordering subsystems and VPR Appliance or On-site Computer, which are located in Homes; The diagram shows a layout of the system modules with a signal 11A from the VPR Appliance 100 or On-site Computer 3A being transmitted to the Area/Local VPR Computer 301 which interface with other VPR Appliance 100 or On-site Computer 3A which further interface with real-time interactive online showrooms (CyberShowRooms) and showcases (CyberShowCases) and with servicing salesperson (CyberSalesPersons) where transactions are made for purchases of appliances, clothing, groceries and many other types of consumer and commercial goods and services. Area/Local Business Owners can also advertise other goods or products for Excess Inventory Purchasing and advertise their services here for Excess Capacity Purchasing instead of with costly TV, Yellow Pages etc. The Regional VPR Computer 303 interface with other VPR Appliance 100 or On-site Computer 3A which further interface with real-time interactive online showrooms (CyberShowRooms) and showcases (CyberShowCases) and with servicing salesperson (CyberSalesPersons) where transactions are made for purchases to include security, fire and carbon monoxide monitoring monitoring services, telecommunications, natural gas, electricity, fuel oil, and other HVAC products and services. Purchase funds are debited from the purchasers account at the VPR System Credit Union 304 with payment going to the seller's bank 305, and rebates going to the purchasers investment company 306. The Certified Purchasing Planner 17 uses a system computer 17A to monitor and advise the purchaser of the best means to increase rebates etc.

Figure 6:
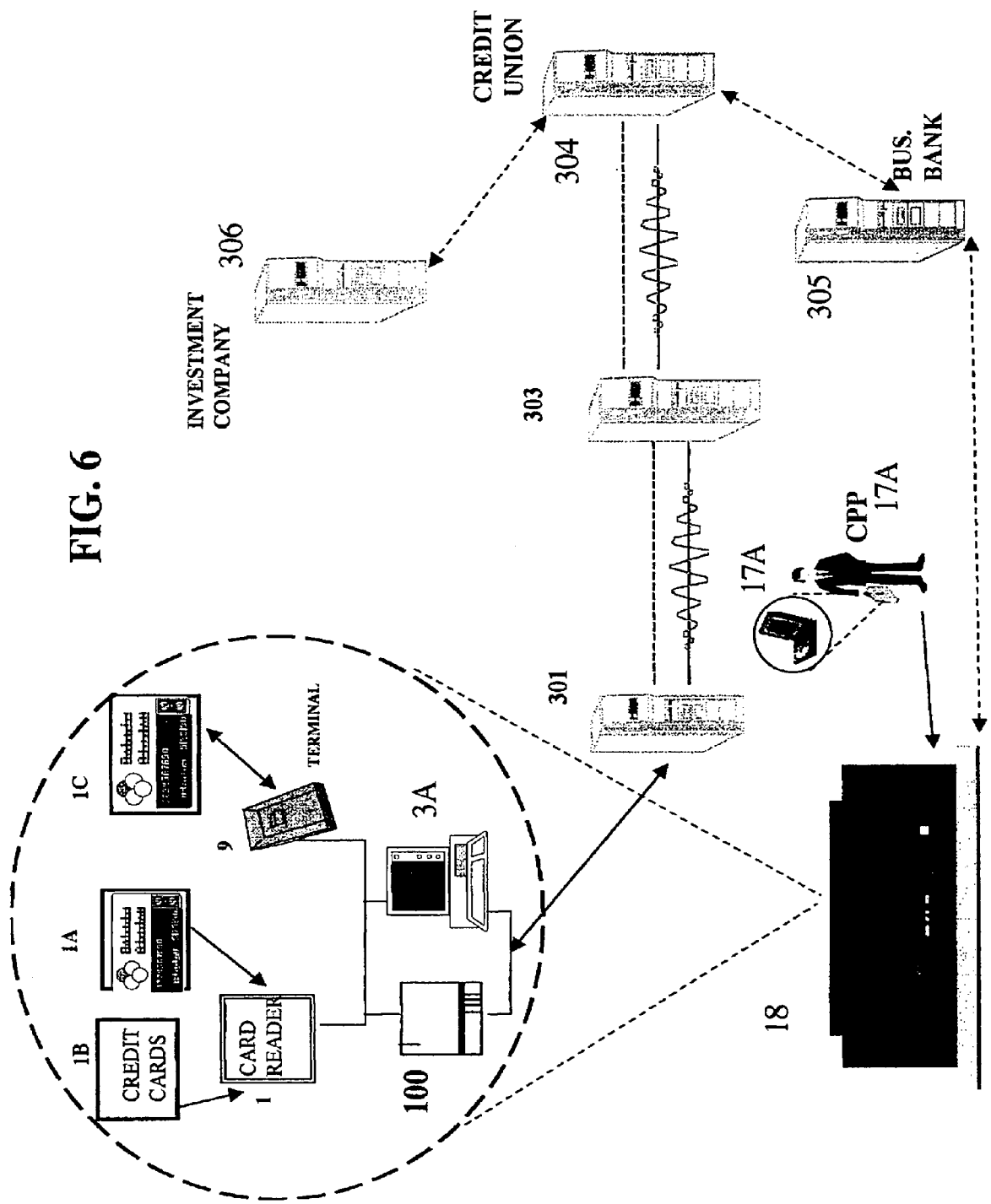
FIG. 6 Illustrates a systems diagram showing the Merchant Real-time interactive online product and services ordering reordering sub-systems and VPR Appliance or On-site Computer, which are located in Commercial Buildings.

FIG. 6 Illustrates a systems diagram showing the Merchant Real-time interactive online product and services ordering re-ordering sub-systems and VPR Appliance or On-site Computer, which are located in Commercial Buildings; The diagram shows a layout of the system with a card reader 1, and terminal 9, interfacing with the VPR Appliance 100 or On-site Computer 3A, which can allow the use of VPR credit cards 1B, VPR debit cards 1A, VPR smart cards 1C or any other type card. The signal from the VPR Appliance 100 or On-site Computer 3A being transmitted to the Area/Local VPR Computer 301 which interface with other VPR Appliance 100 or On-site Computer 3A which further interface with real-time interactive online showrooms (CyberShowRooms) and showcases (CyberShowCases) and with servicing salesperson (CyberSalesPersons) where wholesale transactions are made for purchases of appliances, clothing, groceries and many other types of consumer and commercial goods and services. Area/Local Business Owners can also advertise other goods or products for Excess Inventory Purchasing and advertise their services here for Excess Capacity Purchasing instead of with costly TV, Yellow Pages etc. The Regional VPR Computer 303 interface with other VPR Appliance 100 or On-site Computer 3A which further interface with real-time interactive online showrooms (CyberShowRooms) and showcases (CyberShowCases) and with servicing salesperson (CyberSalesPersons) where wholesale transactions are made for purchases include security, fire and carbon monoxide monitoring monitoring services, telecommunications, natural gas, electricity, fuel oil, and other HVAC products and services. Purchase funds are debited from the purchasers account at the VPR System Credit Union 304 with payment going to the seller's bank 305, and rebates going to the purchasers investment company 306. The Certified Purchasing Planner 17 uses a system computer 17A to monitor and advise the purchaser of the best means to increase rebates etc.

Figure 7:
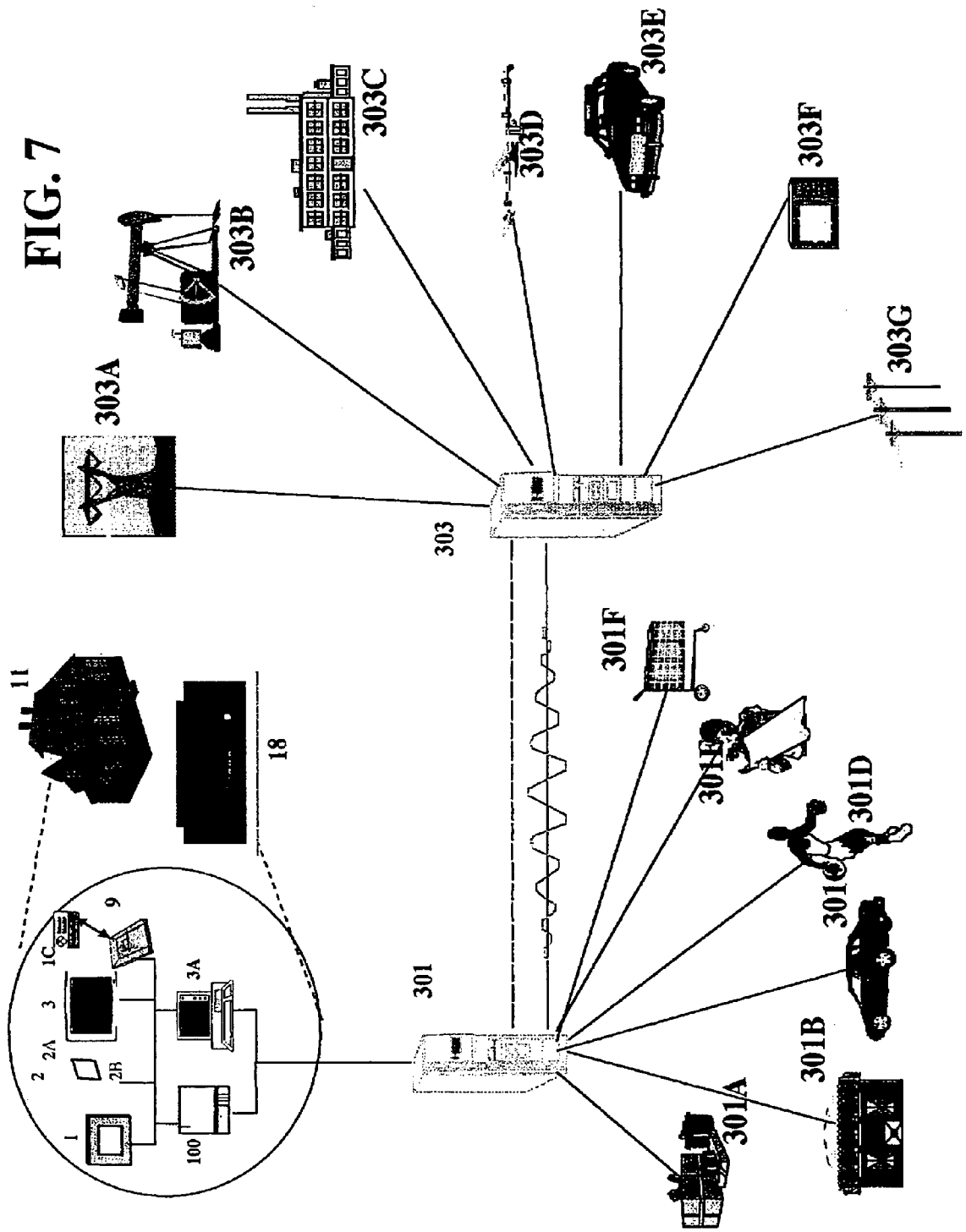
FIG. 7 Illustrates a systems diagram showing a home and commercial building with the Real-time interactive online product and services ordering and re-ordering System, VPR Appliance or On-site Computer payment card and terminal.

FIG. 7 Illustrates a systems diagram showing a home and commercial building with the Real-time interactive online product and services ordering and re-ordering System and VPR Appliance 100 or On-site Computer 3A; The diagram shows a layout of the system modules located in Homes 11 and Commercial Buildings 18 wherein Purchasers will use various purchasing cards to include VPR credit cards 1B, VPR debit cards 1A, VPR smart cards 1C or any other type card suitable for present invention purchasing. Input devices such as card reader 1, and terminal 9, interfacing with the VPR Appliance 100 or On-site Computer 3A, which can allow said VPR credit cards 1B, VPR debit cards 1A, VPR smart cards 1C or any other type card pay for the selected goods, products or service and facilitate rebates for the purchasers investment account. It also shows a signal from the VPR Appliance 100 or On-site Computer 3A being transmitted to the Area/Local VPR Computer 301 where orders from all over the area are combined and volume purchases are made from local vendors for appliances and gifts 301A, clothing 301B, groceries 301F, autos 301 C, sports and entertainment 301D and many other types of consumer and commercial goods and services 301E. Area/ Local Business Owners can also advertise other goods or products for Excess Inventory Purchasing and advertise their services here for Excess Capacity Purchasing instead of with costly TV, Yellow Pages etc. The Regional VPR Computer 303 facilitates non-local volume purchases. To include security, fire and carbon monoxide monitoring services 303E, telecommunications 303G, natural gas and fuel oil 303B, electricity 303A, airline tickets etc. 303D and other products 303C and 303F and services.

Figure 8:
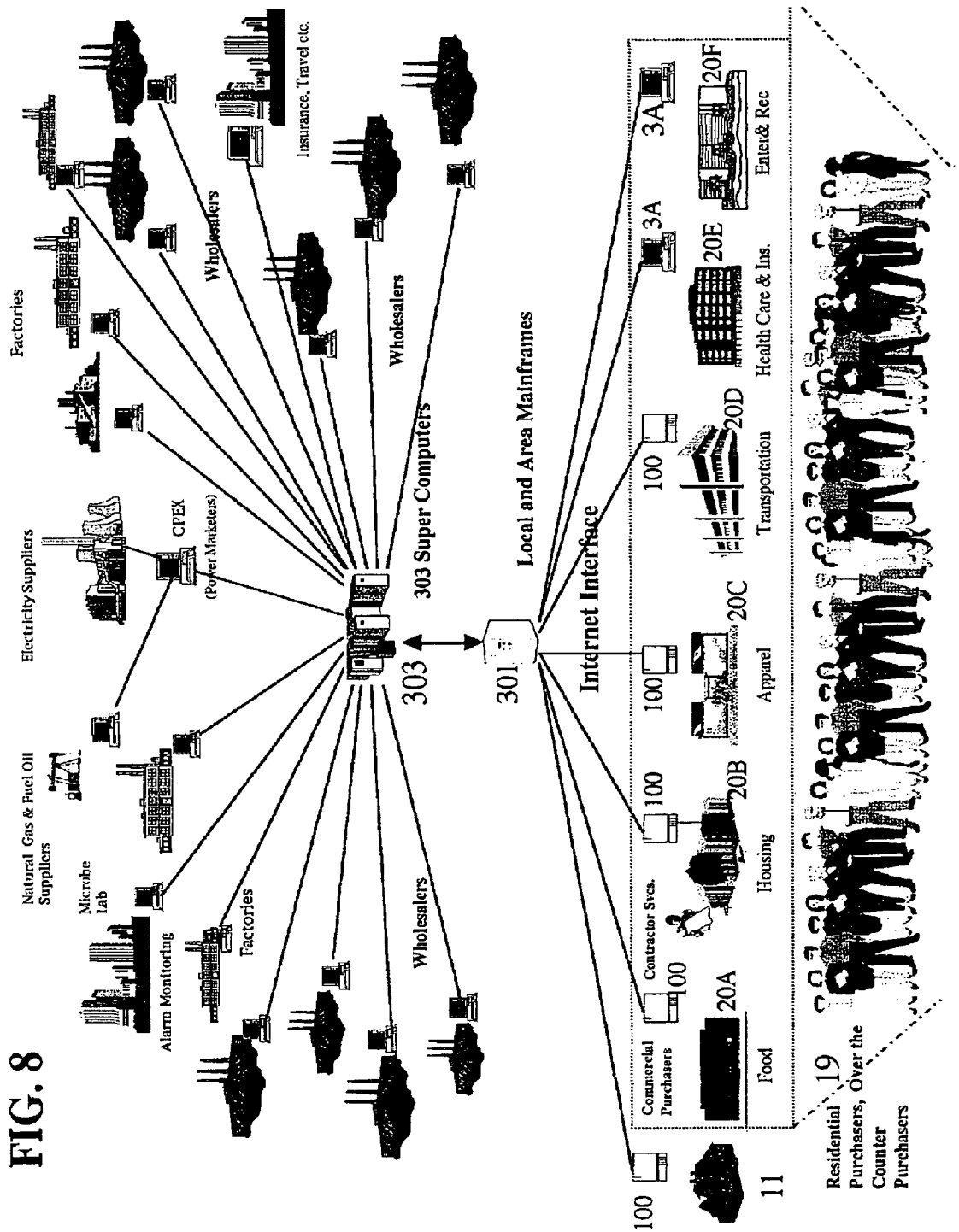
FIG. 8 Illustrates the Real-time interactive online, over-the-counter purchasing systems network diagram.

FIG. 8 Illustrates the Real-time interactive online, over-the-counter purchasing systems network diagram; The diagram shows the product and services ordering and reordering System and VPR Appliance or On-site Computer, which are located in the home 11 or in a variety of establishments that represent the various type businesses (food 20A, housing 20B, apparel 20C, transportation 20D, health care and insurance 20E, entertainment and recreation 20F) the government uses for economic indicators. The diagram shows all types of persons that make Over-The-Counter Volume Purchases 19, who make over the counter purchases from merchants who have the VPR Appliance 100 or On-site Computer 3A. The diagram further shows the interface between the VPR Appliance 100 or On-site Computer 3A and network local/area mainframes 301 and regional super computers 303. The mainframe 301 and super computer 303 contain as much as possible the complete universal barcode database and they constantly monitor and query each other as well as the databases of affiliate wholesalers 303C and manufacturers 303H.

Figure 9:
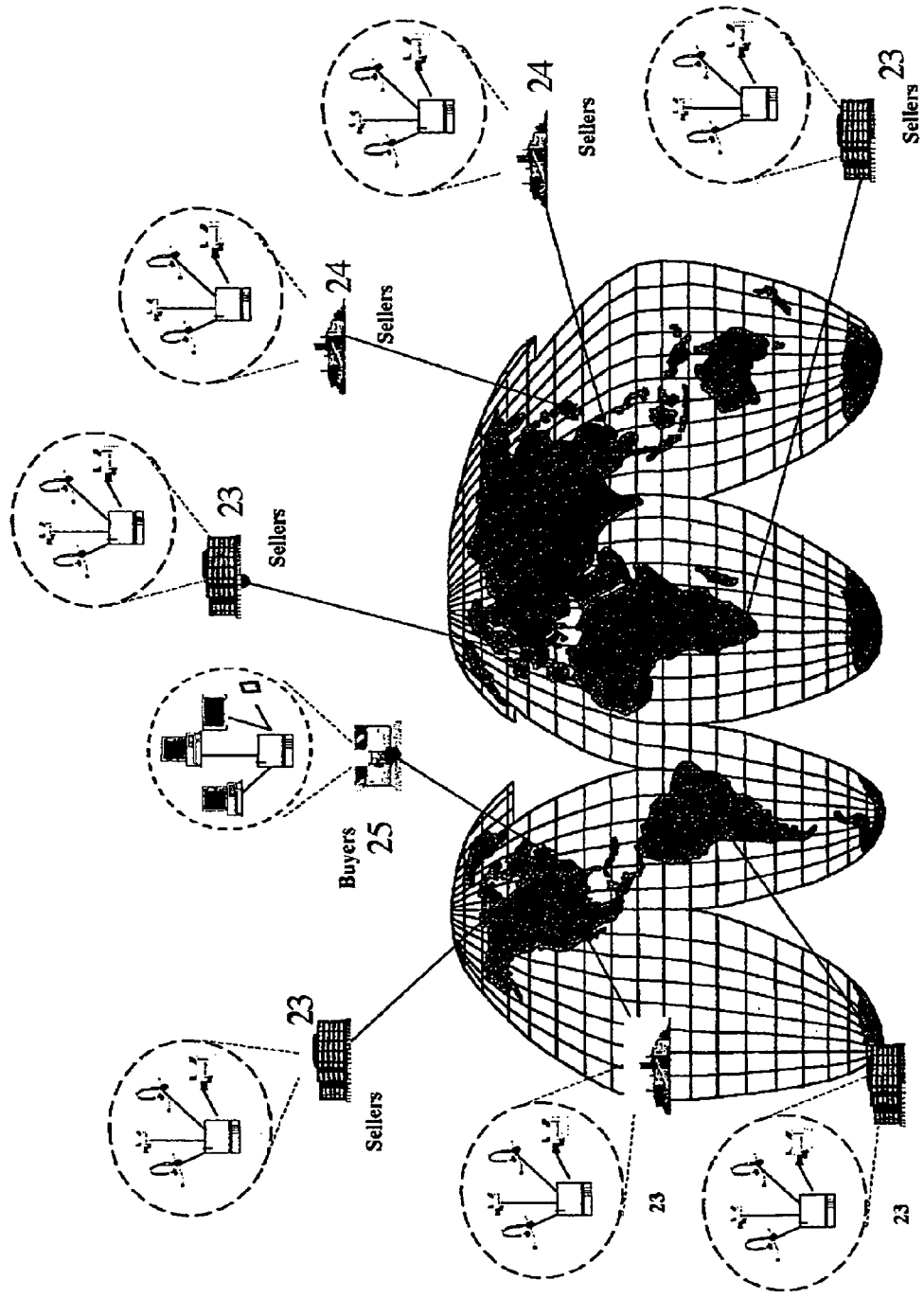
FIG. 9 Illustrates the WorldWholesaler Concept for Merchant Buyers.

FIG. 9. Illustrates the WorldWholesaler Concept for Merchant Buyers; The diagram shows countries around the world 26 and the product and services ordering and re-ordering CyberSalesPerson Sub-System (represented by headsets) and CyberShowCases or CyberShowRooms (represented by cameras) interfacing with VPR Appliance 100, which are located in a variety of establishments that represent wholesaler venues 23, factories 24, small retail establishments 25, To accomplish this strategy, the VPR Organization will acquire or affiliate with all types of stores, shops, 18, 20A, 20B, 20C, 20D, 20E, 20F, and other establishments from around the world. The VPR Organization will use these stores, shops, 18, 20A, 20B, 20C, 20D, 20E, 20F, and establishments as Cyber showrooms etc., and ship goods to customers from more centralized warehouses etc.

Figure 10:
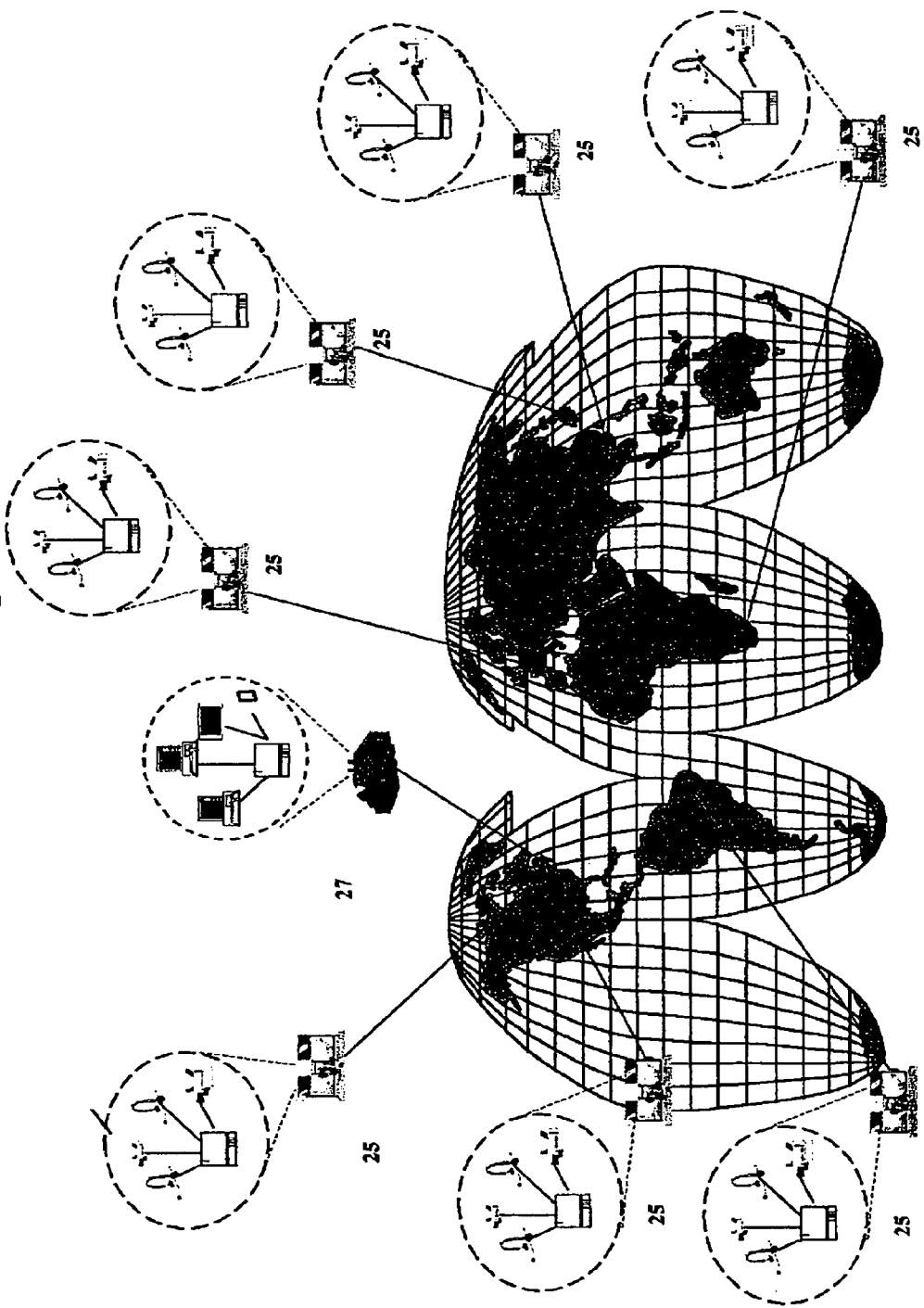
FIG. 10 Illustrates the WorldMall Concept for Individual Shoppers.

FIG. 10 Illustrates the WorldMall Concept for Individual Shoppers; The diagram shows countries around the world and the product and services ordering and re-ordering CyberSalesPerson Sub-System (represented by headsets) and CyberShowCases or CyberShowRooms (represented by cameras) interfacing with VPR Appliance 100, which are located in a variety of establishments that represent small retail establishments 25, and home office establishments 27. To accomplish this strategy, the VPR Organization will acquire or affiliate with all types of stores, shops, 18, 20A, 20B, 20C, 20D, 20E, 20F, and other of establishments from around the world. The VPR Organization will use these stores, shops, 18, 20A, 20B, 20C, 20D, 20E, 20F, and establishments as CybershowRooms etc., and ship goods to customers from more centralized warehouses etc.

Figure 11:
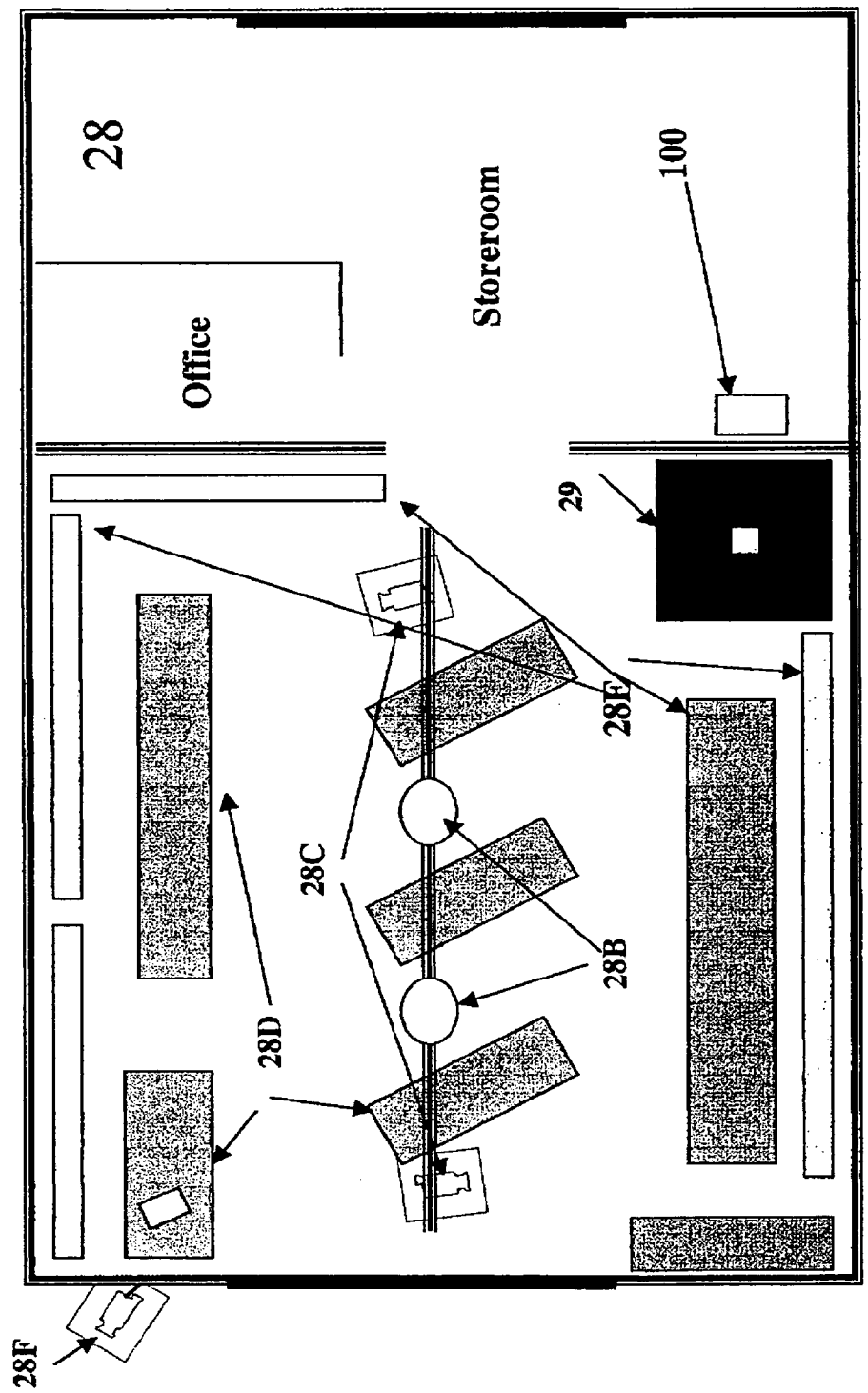
FIG. 11 Illustrates a Top View of the CyberShowRoom Concept.

FIG. 11 Illustrates a Top View of the CyberShowRoom Concept; It shows the interior of a shop, showroom, or tradeshow booth 28 in which there is installed a CCTV purchasing system in accordance with the present invention. The CCTV purchasing system includes pan, tilt, and zoom cameras that are mounted on a track 28C, or in domes 28B or on a variety of stands 28F. The pan, tilt, zoom cameras are movably supported on an elongated tracks or rails or in domes which are suspended from the ceiling or from the walls of the CyberShowRoom. Signals from the cameras are processed, digitally recorded in the VPR Appliance 100 or On-site Computer 3A and transmitted as the situation dictates. These cameras allow real-time interactive online viewing of the shop, showroom, or tradeshow booth floor or see inside glass counters 28D and showcases 28E from anywhere in the world. The systems brings movement and interactive functionality to a web site allow users to see and interact with each other and to virtually visit and browse through venues worldwide. In essence, the video systems become proxy eyes and the audio systems become the proxy ears and voices of the clients. Thus, if two of more people are a long distance apart and have a need for face to face discussion, or a need to view information or objects while conducting the face to face discussion, using the technology will save them a great deal of time and money. The systems will be easy to use and relatively low in cost.

Figure 12:
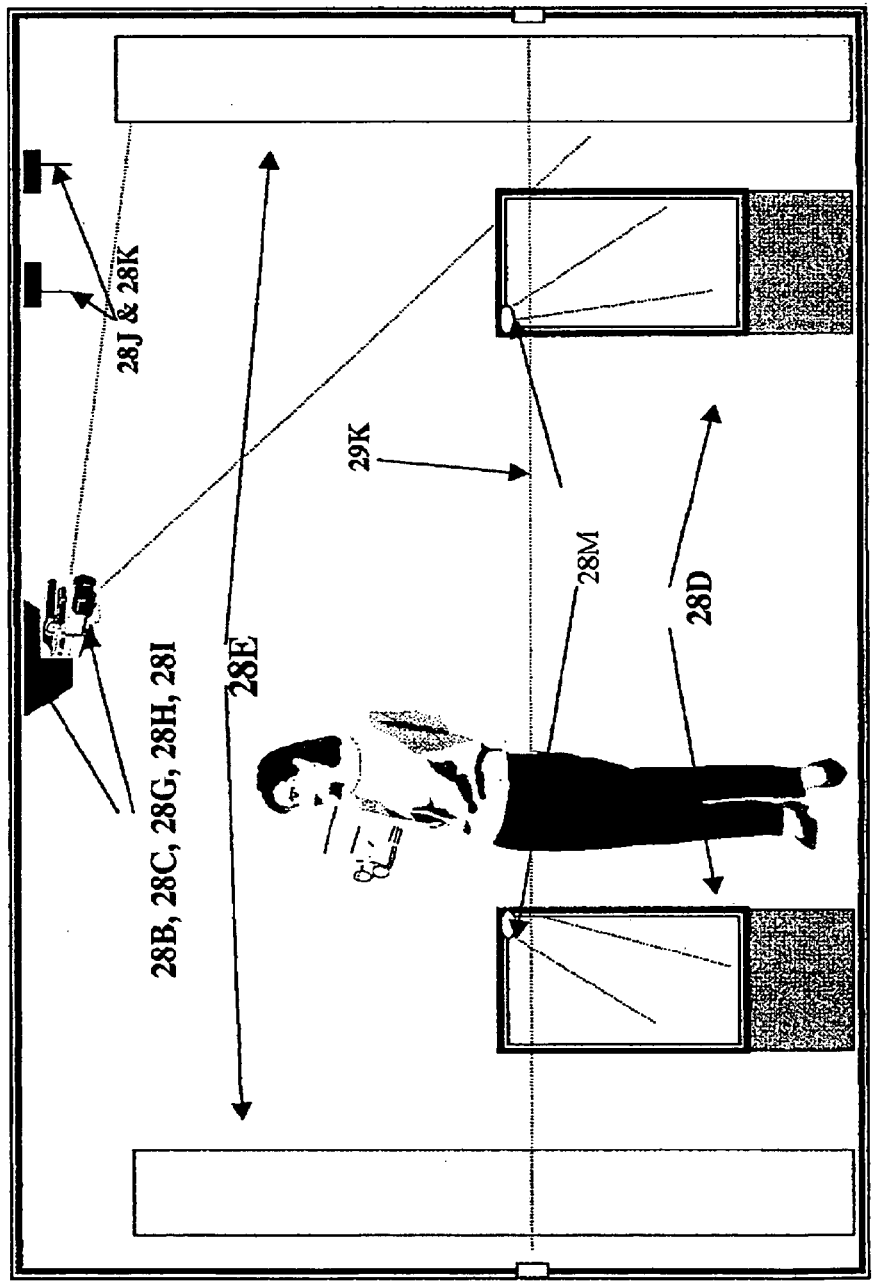
FIG. 12 Illustrates an End View of the CyberShowRoom Concept.

FIG. 12 Illustrates an End View of the CyberShowRoom Concept; It shows an Over-the Counter-Shopper 19 in the interior of a CyberShowroom, or tradeshow booth 28A in which there is installed a CCTV purchasing system in accordance with the present invention. The CCTV purchasing system includes pan, tilt, and zoom cameras that are mounted on a track 28C, or in domes 28B. The pan 28G, tilt 28H, zoom 28I, cameras are movably supported on an elongated tracks or rails or in domes which are suspended from the ceiling or from the walls of the CyberShowRoom. Signals from the cameras and from wireless receiving and transmitting devices such as Buyers and Sellers Sub-Systems are received by the wireless antenna 28J and transmitted from the wireless transmitter antenna 28K whereupon the signals are conveyed to, processed, and digitally recorded in the VPR Appliance 100 or On-site Computer 3A and transmitted as the situation dictates. These cameras and other showcase cameras 28M, allow real-time interactive online viewing of the shop, showroom, or tradeshow booth floor or see inside glass counters 28D and showcases 28E from anywhere in the world. The venue entry and exit detection beam 29K automatically notify shop personnel when an Over-The-Counter shopper 19 enters or leaves the site and makes adjustments to the VPR Appliance 100 or On-site Computer 3A as appropriate. The systems brings movement and interactive functionality to a web site allow users to see and interact with each other and to virtually visit and browse through venues worldwide. In essence, the video systems become proxy eyes and the audio systems become the proxy ears and voices of the clients. Thus, if two of more people are a long distance apart and have a need for face to face discussion, or a need to view information or objects while conducting the face to face discussion, using the technology will save them a great deal of time and money. The systems will be easy to use and relatively low in cost.

Figure 13:
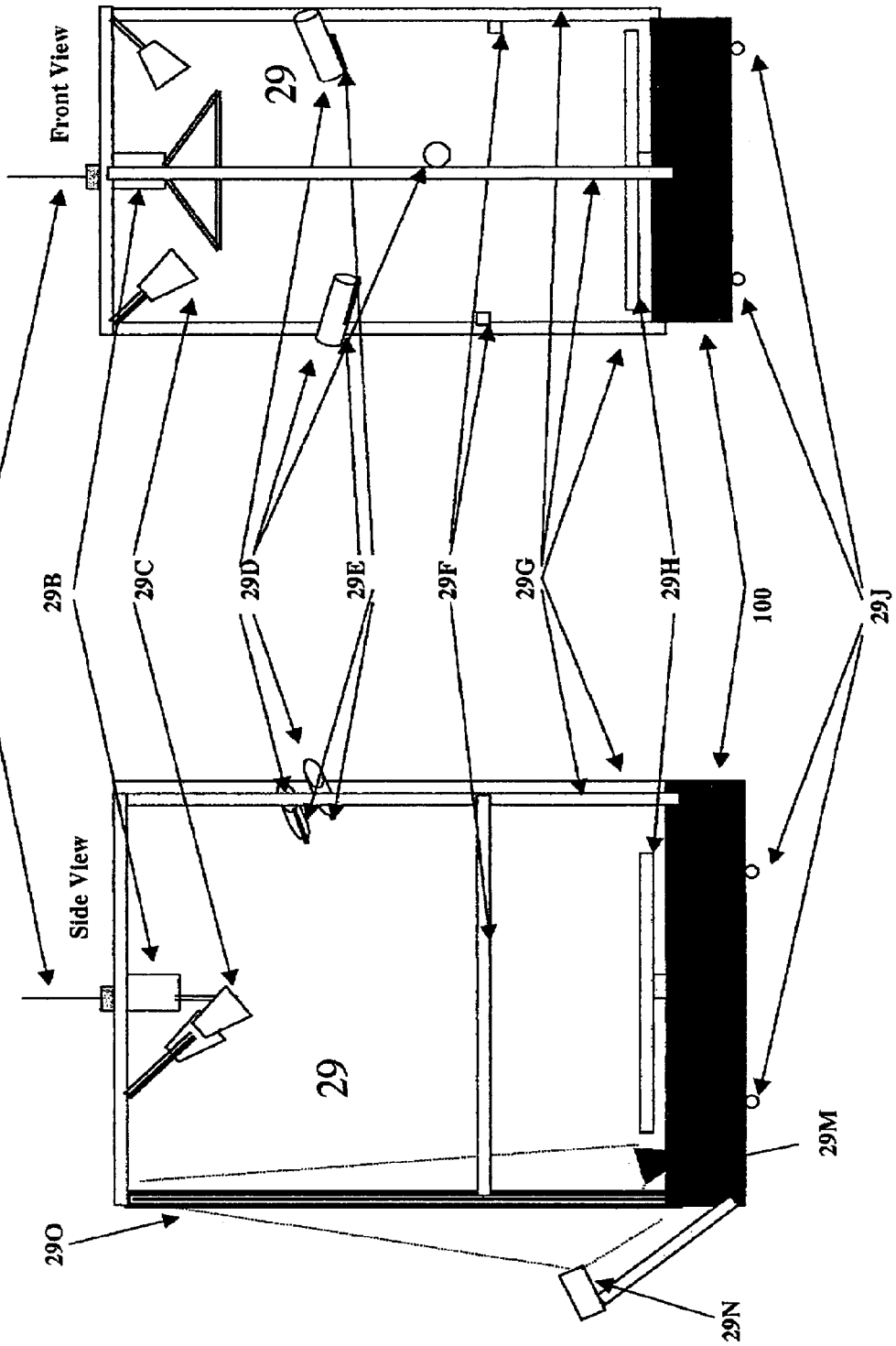
FIG. 13 Illustrates the Remote Operated Online Product Demonstration System (CyberShowCase) Concept Comprising.

FIG. 13 Illustrates the Remote Operated Online Product Demonstration System (CyberShowCase) Concept Comprising:

A merchandise display apparatus that allows real-time interactive online viewing of objects or information. The apparatus includes means for a shopper to use his/her VPR Appliance 100 or On-site Computer 3A as appropriate and call up the unit, view the merchandise and if desired, get a much better full view of the displayed merchandise by controlling the motorized revolving hanger rack 29B, the motorized revolving platform 29H, cameras 29D, and other components of the unit. During normal operations, the cameras 29D view the merchandise from a position forwardly of the motorized revolving hanger rack 29B and the motorized revolving platform 29H which is above the equipment bay 29I of the unit. Displayed merchandise is illuminated by one or more track mounted floodlights 29C and adjustable light rails 29F. To the CCTV camera 29D, the displayed merchandise stands out in space, the motorized revolving platform 29H and motorized revolving hanger rack 29B being concealed by the direction from which the product is viewed. When it is desired to position the camera above the product the lower edge of the backdrop may be curved forwardly all along the motorized revolving platform 29H thereby concealing the motorized revolving platform from the picture taken. A principal feature of the present invention is the means for changing the scene comprising a multi-colored backlight system 29M, a rear screen projection system 29N, and a white backdrop system 29O. The unit's communication system is contained in the VPR equipment bay 29I allows full-duplex communications with signals being conveyed through the system antenna 29A or by some other means. The unit also allows wide adjustability of components, the pan, tilt, and zoom cameras 29D are adjustable in elevation by moving the cameras mounting slide along the adjustable camera racks w/conduit 29G.

Figure 14:
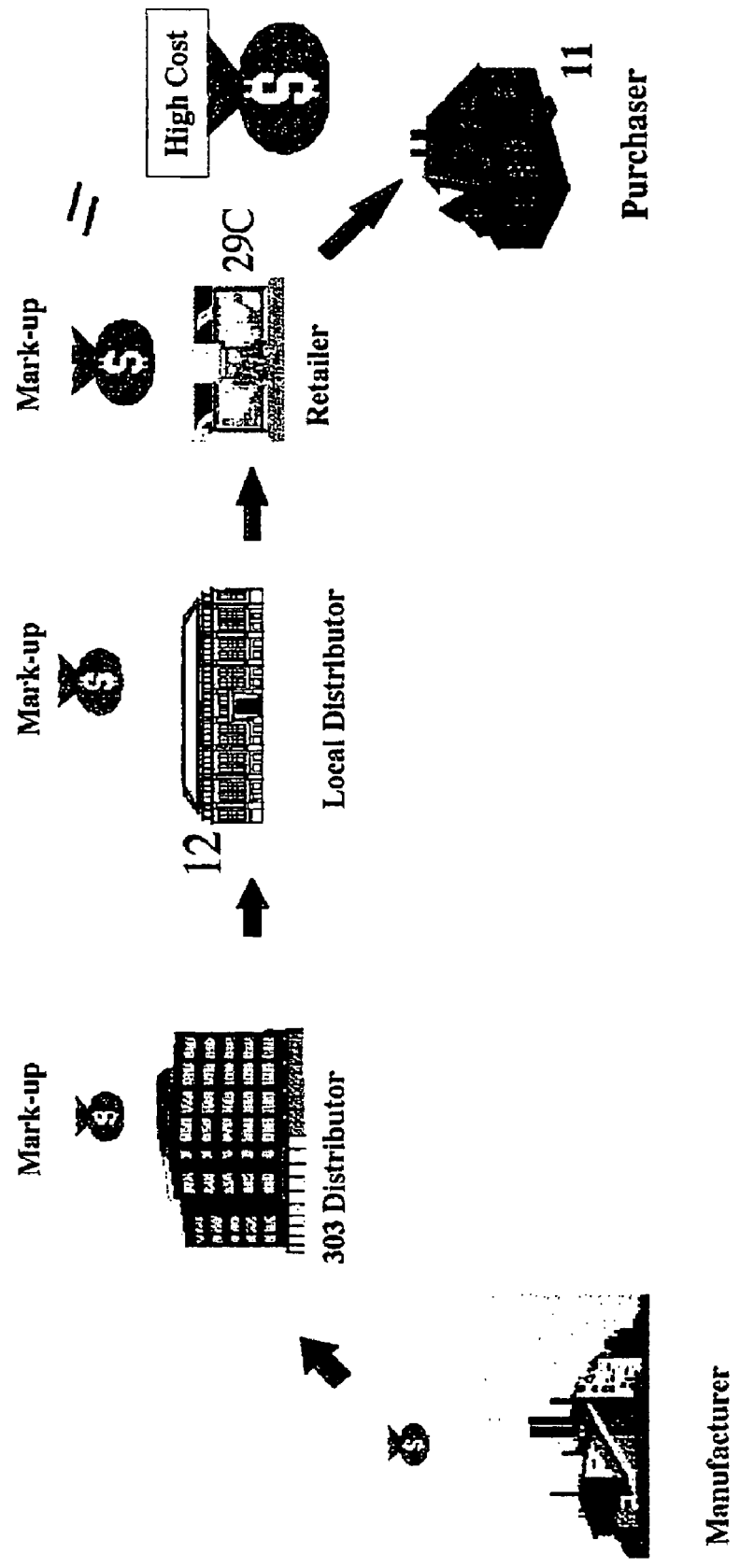
FIG. 14. Illustrates Normal Distribution and Mark-Up.

FIG. 14 Illustrates Normal Distribution and Mark-Up, it shows the normal goods, products or services distribution chain and shows how the cost of said goods, products or services increase as they move through the distribution chain from manufacturer to Regional Distribution who add mark-up on to the retailer who add additional mark-up prior to sale to the consumer/merchant purchaser who pays a considerable amount more than for the item than if purchased directly from manufacturer.

Figure 15:
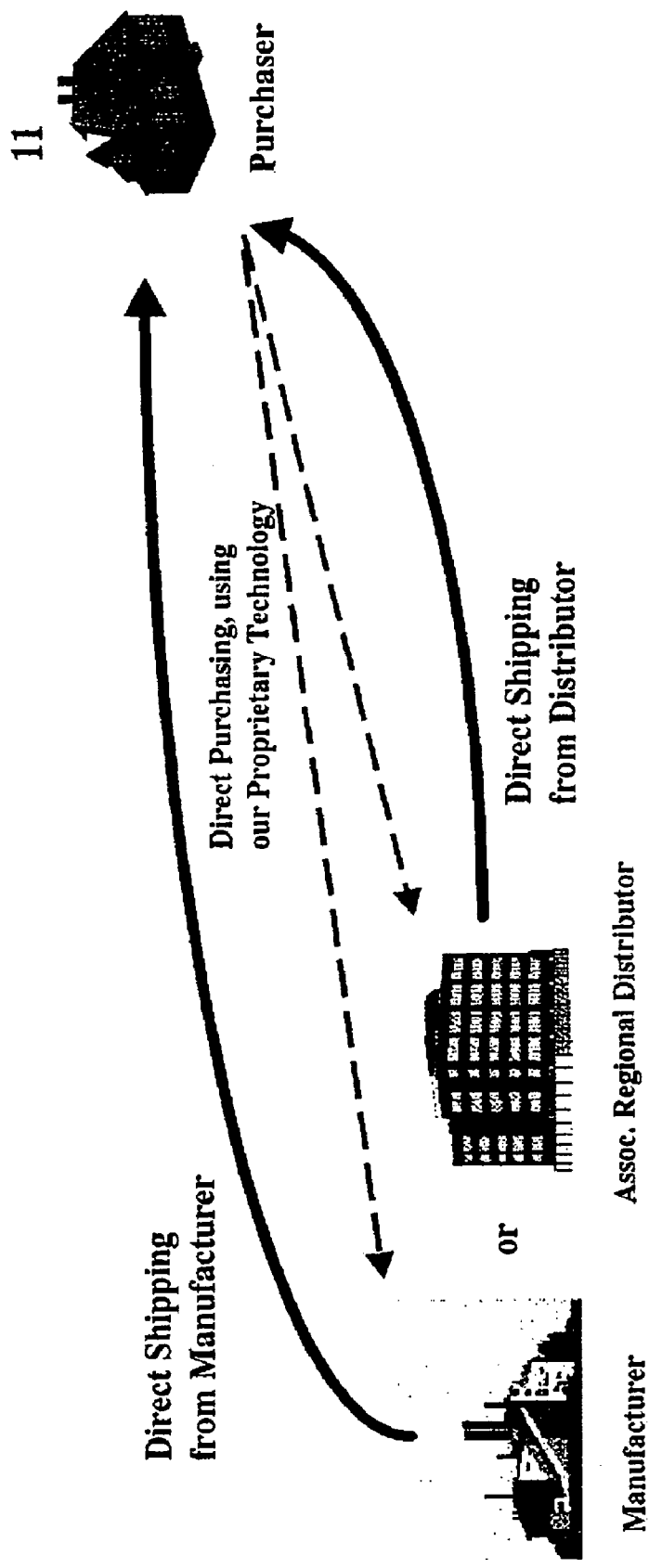
FIG. 15 Illustrates Individual Internet Purchasing and Distribution Cycle.

FIG. 15 Illustrates Individual Internet Purchasing and Distribution Cycle of the present invention. It shows the home purchaser 11 in a transaction with manufacturers or regional distributor and direct purchasing using the proprietary technology of the present invention, which is in effect group purchasing yet purchasing as an individual and obtaining volume purchasing prices and benefits while doing so. These transactions will provide high quality goods, products or services that are conveniently organized into departments by brand and category such as food products and services, housing products and services, apparel products and services, transportation products and services, health care products and services, insurance products and services, entertainment and recreation products and services. While the illustration is not actually showing all of the novel items and means brought forth in this invention on this illustration, it is hereby noted that these items are used separately or together for the real-time interactive purchasing transactions to include volume purchasing, or excess inventory purchasing or excess capacity purchasing of goods, products or services.

Figure 16:
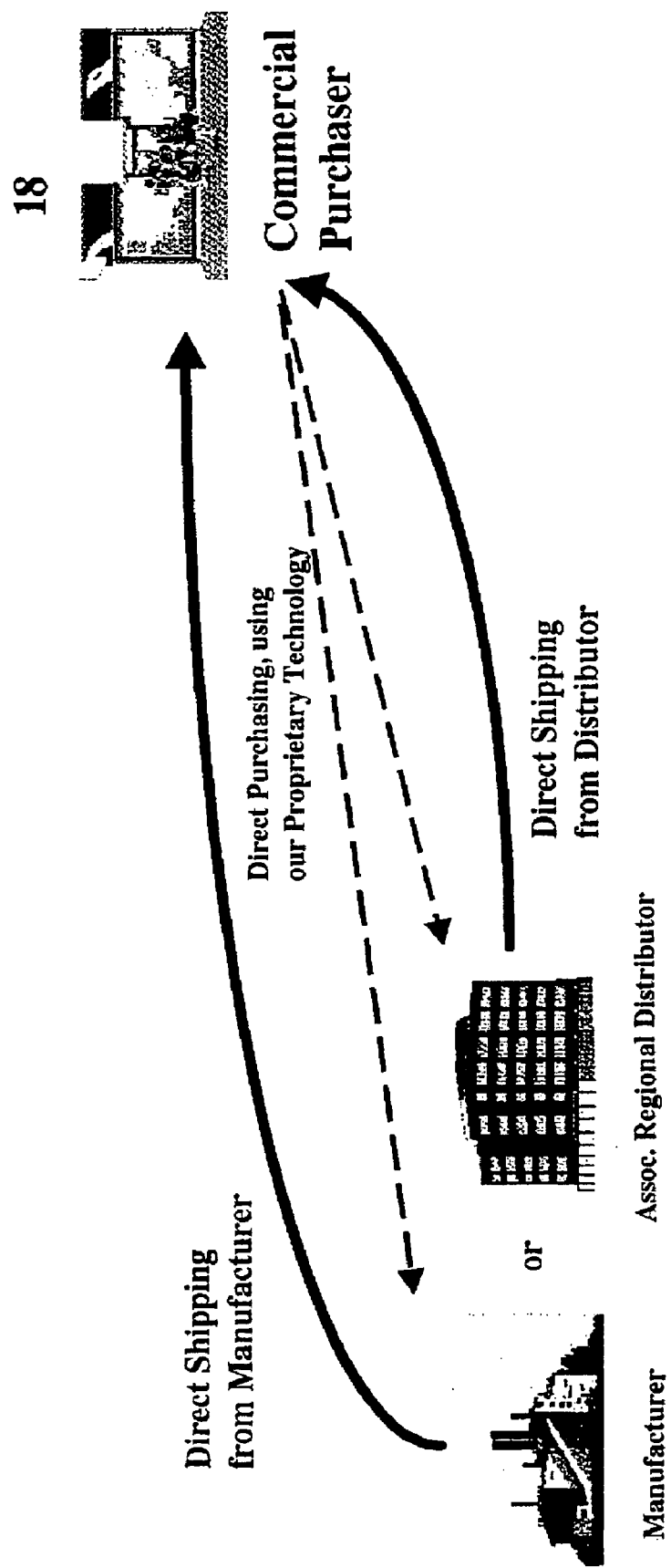
FIG. 16 Illustrates Commercial Purchaser Internet Purchasing and Distribution Cycle FIG. 17 Illustrates How Mark-Up is Eliminated and Rebates Added.

FIG. 16 Illustrates Commercial Purchaser Internet Purchasing and Distribution Cycle of the present invention. It shows the commercial purchaser 18 in a transaction with manufacturers or regional distributor and direct purchasing using the proprietary technology of the present invention, which is in effect group purchasing yet purchasing as an individual and obtaining volume purchasing prices and benefits while doing so. These transactions will provide high quality goods, products or services that are conveniently organized into departments by brand and category such as food products and services, housing products and services, apparel products and services, transportation products and services, health care products and services, insurance products and services, entertainment and recreation products and services. While the illustration is not actually showing all of the novel items and means brought forth in this invention on this illustration, it is hereby noted that these items are used separately or together for the real-time interactive purchasing transactions to include volume purchasing, or excess inventory purchasing or excess capacity purchasing of goods, products or services.

FIG. 17 Illustrates How Mark-Up is Eliminated and Rebates Added—and shows the cumulative affect of using the online real-time interactive ordering and reordering Volume Purchasing Rebate Investing technology of the present invention for purchasing transactions. It further shows the eliminations of most mark-up and obtaining rebates, which would normally be this mark-up, and the placing of said rebates into the purchasers investment account.

FIG. 18 Illustrates Over-The-Counter Purchasing and Rebates and shows the cumulative affect of using the real-time interactive over-the-counter Volume Purchasing Rebate Investing technology of the present invention for purchasing transactions. It further shows a purchaser making over-the-counter Volume Purchasing transactions of all types goods, products or services and obtaining rebates which are placed into the purchasers investment account.

Purchasing

The Invention encompasses technology that will greatly facilitate the sale of goods and services while providing customers with a means to painlessly fund their Individual Retirement Accounts. The present invention will facilitate the offering of tens of thousands of products from several hundred manufacturers through online stores on the Internet, through [Over-The-Counter Purchase] Over-The-Counter Volume Purchase with local merchants and contractors and through Real-time Interactive purchases with merchants and wholesalers around the world. The Invention provides an online shopping experience that incorporates traditional shopping mall and mail order features into an interactive, easy-to-use and compelling online environment. Online technology, and the Internet in particular, is an advantageous medium for the selling of merchandise relative to traditional retail stores and mail-order catalogs. Leveraging online technology and the global reach of the Internet, the online retailing and wholesaling model of the present invention provides virtually unlimited online shelf space and the ability to reach a geographically unlimited customer base, without the costs associated with constructing traditional retail stores and distributing mail-order catalogs. The Invention's strategy is to offer quality merchandise, provide effective customer service, and capitalize on the inherent economies of the online retailing model by allowing the purchaser to purchase excess inventory and excess capacity from merchants and vendors of all types.

The Invention provides for transacting with merchant in online stores over the Internet or by over-the-counter stores in malls or other venues. The Invention's online stores will provide high quality color video camera images and detailed information relating to products or services that are conveniently organized into departments by brand and category such as food products and services, housing products and services, apparel products and services, transportation products and services, health care products and services, insurance products and services, entertainment and recreation products and services.

Shoppers can search for, browse and select products throughout the stores and place selected merchandise in virtual shopping carts that facilitates the process of collecting items, subtotaling purchases and reaching the purchase decision. Furthermore, The Invention will establish strategic relationships with manufacturers, which allow most products to be rapidly shipped directly from the manufacturer. Manufacturer direct shipping enables the VPR Organization by way of the Certified Purchasing Planner to assist merchants in avoiding inventory-related risks; limit overhead costs and provides prompt delivery. As part of its marketing strategy, the VPR Organization using the Certified Purchasing Planner will form strategic alliance with local merchants and contractors pursuant to a marketing agreement. In addition, the Certified Purchasing Planner plans to establish strategic alliances with other online companies and begin a targeted advertising campaign to attract additional customers to the its online stores. It is believed that both online and traditional media exposure are critical to maximizing brand recognition and driving traffic to its online stores.

Products

The present invention's brick and mortar stores or store on the Internet will offer tens of thousands of products from several hundred manufacturers. Products or services range widely in price Internet products or services will be featured with a high quality color picture and detailed information relating to product or service specifics, service care or purchasing instructions. The present invention's store on the Internet is designed to accommodate the needs of both the browser and the directed shopper. The browser can view an array of products or services by simply clicking on one of the feature departments or service categories. The directed shopper is able to quickly locate a specific product or service by category or brand by using the store's search function or store directory. By clicking on the picture of a product or service, the customer is presented with detailed information relating to product or service specifics, service, care or purchasing instructions.

The present invention seeks to provide a compelling shopping environment that will attract customers and encourage shoppers to purchase. The present invention intends to add sound and video features to its Internet store that will guide shoppers through the store and announce special offers. The present invention also aims to make the shopping experience as simple and convenient as possible. The present invention features a virtual shopping bag function that allows the shopper to accumulate merchandise for purchase while browsing through the store. Items can be added to or subtracted from the shopping cart at any time. As a registered member, the customer is able to retain items in the shopping cart indefinitely, even after leaving the store or logging-off. After selecting an item to purchase, the customer is prompted to complete an order. In choosing a payment method when placing an order, customers have the option of securely submitting credit card information online or telephoning or faxing the information to customer service representatives. The present invention also provides the option of payment by check or money order. The present invention sends e-mail notifications that confirm the order and shipment and promote special offers and events.

Worldwide Shopping and Buying can be accomplished whereby the VPR Organization will acquire or affiliate with all types of stores, shops, and other of establishments from around the world. The VPR Organization will use these stores, shops, and establishments as CybershowRooms etc., and ship goods to customers from more centralized warehouses etc.

[The Purchasing Facilitation System (PFS)] The Volume Purchase Rebate (VPR) Appliance is a powerful modular assembly comprising microprocessor and other devices that greatly increases the efficiency of the purchasing process and includes sub-circuits, relays other devices, sub-systems and components that compress and decompress bandwidth and connects to POTS, and wide bandwidth wireless, DSL, Fiber Optic, Cable, Satellite or any other signal conveying means. The VPR Appliance then allows the transmission and reception of real-time digital, optical, analog or any other type of data, video and audio signals or information to better facilitate combines into one device a method and apparatus to remotely monitor, control and manage the environment of buildings and to detect fire, smoke and intrusion; to measure fuel oil, water, natural gas and electricity; to remotely control the operation of furnaces, boilers, heat pumps, air conditioners, lights, appliances and hot water heaters; to prevent foul odors and clogging of plumbing pipes and the flooding of these buildings due to the building of grease, gelatin and other waste in these plumbing pipes to clog.

The VPR Appliance or On-site Computer also includes systems to monitor purchasing peaks and valleys during the year to facilitate the purchasing and selling of excess inventory and capacity.

[On Line Systems Technology] Purchasing Agent Sub-System;

Comprises said the VPR Organization and the Certified Purchasing Planner (CPP) who are the purchasers' personal volume purchasing purchasing agent and assists purchasers in obtaining all volume purchasing benefits and in doing so, they use the sophisticated information services delivery and shopper tracking systems by integrating third-party systems. These information systems can be viewed as the integrated systems: (i) a publishing system, (ii) a selling system and (iii) CCTV System (iv) and order processing system, all of which are supported by Relational CyberShowRoom This segment of the present invention interfaces with the VPR Appliance or On-site Computer and relates generally to closed-circuit television purchasing systems and pertains more particularly to such systems in which a television camera is mounted on a carriage for movement along a rail or track and in which the system is subject to automatic control by a computer or the like.

It is known to provide closed circuit television purchasing systems using either cameras in a fixed location or cameras that are mounted for movement along a track, dome or stand It is also known, in the case of a system using a fixed-position camera, to provide automatic acquisition of a product object in response to an command signal or the like. Assuming that data has previously been stored in the control system to indicate the required direction of view and appropriate zoom and/or focus condition for the camera to provide an image of the product, the control system can implement an immediate adjustment to the camera direction, zoom condition, etc. so that an image of the product is provided by the camera within a very short time.

However, when the system utilizes a moving camera, such as a camera mounted on a carriage that travels along a rail, the camera may be located at any arbitrary position in its range of movement at the time a command is received. Since the camera location at the time of the command cannot be known in advance, it is not possible to store in advance data defining a particular direction and zoom condition of the camera, which will enable the camera to provide an image of the product from the position of the camera at the time of the command.

The present invention also includes methods of simulating the motion of real-time shopping through the use of pan, tilt and zoom cameras, which enhance product presentation through motion etc. In the case of an operator-attended purchasing system, the human operator may attempt to respond to the command signal by operating system controls to reposition the camera carriage and to adjust the camera direction, etc. so that an image of the product is obtained. However, the variety of possible camera positions and directions-of-view may lead to disorientation on the part of the operator. Also, if the system is set up with multiple products for which commands may be actuated, the operator may have difficulty identifying the particular product to which the command pertains. As a result, the human operator's response to the command may be too slow, thus causing the operator to become frustrated.

While it might be proposed to define a predetermined position along the track to which the camera should be moved in response to an command which pertains to a particular product, and then an appropriate direction of view and zoom condition data could also be stored for providing an image of the product from that predetermined position, such an approach carries the disadvantage that a significant amount of time may be required to move the carriage to the predetermined position from the position of the carriage at the time the command is received. Even if automatic camera direction and zoom adjustments are performed before or during carriage movement so that the camera will be in an appropriate orientation and zoom condition to provide the image of the product as soon as the predetermined carriage position is reached, still product acquisition cannot take place during the time the carriage is in motion, and product acquisition thus may be substantially delayed.

The present invention also includes means and methods whereby shoppers/buyers virtually shop at regional as well as international establishments without leaving the comfort of their homes and businesses. However, purchased products are pre-positioned at strategic locations to speed up delivery to the purchaser etc.

CyberShowCase

This segment of the present invention interfaces with the VPR Appliance or On-site Computer and relates to a new and improved merchant's CyberShowCase which has for its principal purpose to provide a moving and adjustable CCTV system for motorized revolving platform and hanger systems on which the product to be pictured rests and also for a multi-colored backdrop system which is positioned behind the product in the line of sight of the camera. The multi-colored backdrop is preferably illuminated from behind with rear view projection or from the front with either a white light or a light having appropriate color filter. The projectioned or multi-colored backdrop provides a wide variety of scenes as background for the product being photographed.

The present invention encompasses means and methods of giving the presented product motion through the use of pan-tilt-zoom cameras and moving platforms and racks located in the CyberShowCase. Not only do these devices provide motion, but they also present multiple viewing angles to make product presentation more appealing.

The CyberShowCase may be used either as a stationary or mobile showcase. Accordingly, it is a principal product of the present invention to provide an equipment bay on wheels, which contains the equipment and systems to facilitate CCTV production. Another feature of the present invention is the fact it is readily transportable, easily adjustable in many different positions and adaptable to a wide variety of conditions to photography products.

CyberSalesperson

The present invention encompasses means and methods of simulating the shopper actually being in the showroom with the CyberSalesPerson showing the product. The Buyers Sub-System includes a product opening/unsealing station with a ordering sub system with a barcode type reader, and a RF type reader, a camera system with microphone and video display monitor interfaced with the VPR Appliance or On-site Computer that communicates by wireless, online or otherwise with the Seller Sub-System (which includes various cameras such as; a finger bracket camera, eyeglass, cap, beeper etc. covert cameras and various other camera systems which are mounted on tripods or any other type stand or mount). The CyberSalesPerson is also equipped with a R/T capable Headset that has a microphone, earphones and mini-radio unit w/ antenna.

The CyberSalesPerson is equipped with the means to effectively communicate (audio and video) online real-time with the shopper (retail customer) or buyer (wholesale customer) being serviced. These systems interface with the VPR Appliance or On-site Computer or the CyberShowcase or CyberShowroom.

I claim:

1. A system for purchasing merchandise, while real-time interactively direct ordering or reordering by a plurality of purchasers, who are purchasing individually or purchasing as members of an organization that is facilitating purchasing in quantity, and arranging rebates or group purchase rebates paid into retirement accounts, the system comprising:
  (a) one or more purchasing cards, said purchasing cards identifying buyers, and identifying financial institutions, and one or more card readers;
  (b) at least one buyer Purchase Appliance or buyer on-site computer system comprising one or more servers, one or more recording system modules, one or more alarm modules, one or more metering modules, one or more microprocessors, one or more universal barcode ROM microprocessor systems modules, one or more control/relay modules, one or more microprocessor buses, one or more computer/server buses, one or more control/relay buses, one or more power buses, and one or more auxiliary batteries;
  (c) one or more purchasing agent ordering sub-systems;
  (d) one or more communication means by which said at least one buyer Purchase Appliance or on-site computer communicates with one or more seller Purchase Appliances;
  (e) at least one seller Purchase Appliance or seller on-site computer system in communication with at least sensor, said seller Purchase Appliance or seller on-site computer system comprising one or more cameras, said seller Purchase Appliance or seller on-site computer further comprising means for receiving signals for the purchase of goods or services, said signals being received from at least one remote ordering sub-system;
  (f) at least one Purchase hub computer comprising at least one database module or at least one relational database module or at least one look-up module;
  (g) said at least one seller Purchase Appliance or seller on-site computer system being in communication with at least one remote product demonstration sub-system, or one or more seller showrooms, or one or more seller tradeshow booths; and
  (h) said at least one remote product demonstration sub-system, seller showroom, or seller tradeshow booths containing or communicating with at least one merchandise display sub-system which allows real-time interactive remote viewing of physical merchandise, enabling at least one buyer to communicate with said at least one remote product demonstration sub-system, or one or more seller showrooms, or one or more seller tradeshow booths via said at least one seller Purchase Appliance or seller on-site computer, to view physical merchandise, enhancing said buyer's view of said physical merchandise by using said at least one seller Purchase Appliance or on-site computer to interactively move said physical merchandise; and (i) said at least one merchandise display sub-system comprising at least one of a motorized revolving hanger rack or a motorized revolving platform, said physical merchandise being suspended from the motorized hanger rack or being located upon said motorized revolving platform, and said at least one merchandise display sub-system enabling the buyer to move said physical merchandise by remotely controlling said at least one of a motorized revolving hanger rack or a motorized revolving platform;

(j) whereby the one or more purchasing cards identifying buyers are credit, debit, or other funds transfer cards, by which funds are transferred from buyers' credit or debit accounts to sellers' accounts in payment for goods or services bought by buyers, and whereby a portion of said funds transferred from a buyer's credit or debit account when a purchase is made by that buyer are transferred to a second account of said buyer, said second account being an account for the benefit of said buyer in retirement.

2. The system of claim 1, the system being in communication with one or more financial institutions, comprising: one or more credit unions, one or more seller banks, or one or more purchaser account financial institutions.

3. The system of claim 1, wherein the at least one purchasing agent ordering subsystem comprises at least one means for arranging volume purchasing transactions by buyers, at least one Purchase hub computer, at least one means for arranging volume purchasing transactions by agents known as certified purchasing planners, or at least one certified purchasing planner computer.

4. The system of claim 1, wherein at least one Purchase hub computer is a Volume Purchase Rebate Investing Computer and comprises: at least organization module, at least one membership module, at least one broker module, at least one merchant module, at least one meter consumption module for goods and products, at least one monitoring alarm module for services, at least one control module, at least one purchasing module, at least one volume purchasing module, at least one excess inventory purchasing module, at least one excess capacity purchasing module, at least one rebate module, at least one saving account module, and at least one investing account module.

5. The system of claim 1, wherein said at least one buyer can also enhance said buyer's view of said physical merchandise by controlling the position of one or more cameras through which said physical merchandise is viewed.

6. The system of claim 1, wherein the one or more cameras comprised in said seller Purchase Appliance or seller on-site computer comprise at least one of a finger bracket camera, a cap camera, a covert camera, or a camera mounted on a tripod.

7. The system of claim 1, wherein said at least one buyer Purchase Appliance or buyer on-site computer system communicates with said at least one said seller Purchase Appliance which is a seller Volume Purchase Rebate Investing Appliance or seller on-site computer by means of at least one of a direct wire, infrared signal transmission, optical signal transmission, or laser signal transmission.

8. The system of claim 1, wherein said at least one buyer Purchase Appliance or buyer on-site computer system is located in a buyer's home.

9. The system of claim 1, wherein said buyer Purchase Appliance is a buyer Volume Purchase Rebate Appliance, whereby the buyer receives Volume Purchase Rebate Investing information on Volume purchases of merchandise and/or services.

10. The system of claim 1, wherein said second account of said buyer comprises at least one financial investment instrument, and said second account of said buyer comprises at least one IRA account.

11. A system for implementing the individual purchase or volume purchase of merchandise, and for causing rebates to be credited to a retirement account of a buyer, the system comprising:

(a) at least one real-time interactive show-room containing interactive online video and/or audio capturing, processing, or recording means, merchandise displaying means, camera mounting or transversing means, communications, and purchasing facilitation means;

(b) at least one merchandise display case whereon merchandise is placed for real-time interactive online viewing of said merchandise;

(c) said at least one merchandise display case further comprising at least one camera, and means for dial-up real-time interactive viewing;

(d) means for lighting said at least one merchandise display case;

(e) means for changing a scene presented to remote viewers of said merchandise;

(f) means for enabling a remote buyer to interactively move said merchandise placed on said display case, enabling said remote buyer to vary or improve said remote buyer's view of said merchandise; and (g) means for a remote buyer to transfer funds to a seller of said merchandise, in payment for purchase of said merchandise by the remote buyer, or in payment for purchase of other merchandise, or in payment for purchase of services;

(h) wherein a portion of said payment is rebated to an account of said buyer, said account being an account for the benefit of said buyer in retirement.

12. The system of claim 11, wherein said at least one real-time interactive show-room contains a closed circuit television purchasing system or elements thereof, the closed circuit television purchasing system including means for enabling cameras mounted on a track, in a dome, or on a stand, to pan, tilt, or zoom, signals from the cameras being processed or digitally recorded, thereby allowing real-time interactive online viewing of said at least one real-time interactive show-room.

13. The system of claim 11, wherein said at least one merchandise display case comprises track-mounted pan, tilt, or zoom cameras, or lights.

14. The system of claim 11, wherein said at least one real-time interactive show-room further comprises track-mounted pan, tilt, or zoom cameras, glass counters or show cases, system transmission or reception means, or at least one Purchase Appliance for control purposes, or for dial-up real-time interactive viewing purposes.

15. The system of claim 11, wherein said means for lighting said at least one merchandise display case and/or said means for changing a scene presented to remote viewers of said merchandise, comprise one or more of: track lights, multi-colored backlights, a white back-drop, or a rear view projection system.

16. The system of claim 11, wherein said means for enabling a remote buyer to interactively move said merchandise comprises: motorized rotating product hanger racks or motorized rotating product platforms.

17. The system of claim 11, wherein said buyer Purchase Appliance is a buyer Volume Purchase Rebate Investing Appliance, whereby the buyer receives Volume Purchase Rebate Investing information on Volume purchases of merchandise and/or services.

18. The system of claim 11, wherein said account for the benefit of said buyer in retirement comprises at least one financial investment instrument, and said account for the benefit of said buyer in retirement comprises at least one IRA account.

19. A method for purchasing of goods, products or services, by one or a plurality of buyers, who are purchasing individually or purchasing as members of an organization that is facilitating purchasing in quantity, and arranging rebates or group purchase rebates paid into retirement accounts, the method comprising:
 (a) inputting one or more purchasing cards into at least one card reader;
 (b) operating at least one buyer Purchase Appliance or buyer on-site computer comprising one or more servers, one or more recording system modules, one or more alarm modules, one or more metering modules, one or more microprocessors, one or more universal barcode ROM microprocessor systems modules, one or more control/relay modules, one or more microprocessor buses, one or more computer/server buses, one or more control/relay buses, one or more power buses, and one or more auxiliary batteries;
 (c) operating at least one purchasing agent sub-system;
 (d) said at least one buyer Purchase Appliance or on-site computer communicating with one or more seller Purchase Appliances;
 (e) operating at least one seller Purchase Appliance or on-site computer system in communication with at least one sensor, said seller Purchase Appliance or on-site computer comprising one or more cameras, said seller Purchase Appliance or on-site computer receiving from at least one remote ordering sub-system signals for the purchase of goods or services;
 (f) viewing physical merchandise remotely and interactively by at least one buyer, said buyer using said at least one remote ordering sub-system to communicate with at least one remote product demonstration module via said at least one Purchase Appliance or on-site computer; and
 (g) interactively moving, by at least one buyer, said physical merchandise, the moving of said physical merchandise being accomplished by remotely controlling at least one of a motorized revolving hanger rack or a motorized revolving platform, said physical merchandise being suspended from the motorized hanger rack or being located upon said motorized revolving platform;
 (h) ordering said physical merchandise, or other physical merchandise, or services, by at least one buyer;
 (i) transferring payment for merchandise or services from a first account of a buyer to an account of the seller of said merchandise or services; and
 (j) transferring a portion of said payment to a second account of said buyer, said second account being an account for the benefit of said buyer in retirement.

20. The method of claim 19, further comprising processing of said one or more purchasing cards, wherein said processing comprises:
 (k) processing smart cards, debit cards, or other payment cards for payment transactions or rebate transactions or investment transactions at a credit union; or
 (l) processing smart cards, debit cards, or other payment cards for payment transactions or rebate transactions or investment transactions at a seller's bank; or
 (m) processing smart cards, debit cards, or other payment cards for payment transactions or rebate transactions or investment transactions at any other financial institution.

21. The method of claim 19, wherein operating at least one sensor detects or collects product information.

22. The method of claim 19, wherein to effect purchase transactions, members of said purchasing agent sub-system communicate with at least one buyer Purchase Appliance or buyer on-site computer, or at least one seller Purchase Appliance or seller on-site computer, or at least one Purchase hub computer, or at least one agent known as a certified purchasing planner, with at least one certified purchasing planner computer.

23. The method of claim 19, further comprising automatically replenishing a stock of goods or products, wherein automatically replenishing a stock of goods or products comprises at least one seller Purchase Appliance or seller on-site computer communicating with said at least sensor, said at least one seller Purchase Appliance or seller on-site computer receiving signals for the purchase of goods or services, said signals being received from at least one remote ordering subsystem.

24. The method of claim 19, wherein real-time viewing of merchandise is carried out by said at least one seller Purchase Appliance or seller on-site computer communicating with at least one remote product demonstration module, or at least one seller's subsystem, said least one remote product demonstration module or at least one seller's subsystem being contained in at least one seller showroom, or at least one seller tradeshow booth.

25. The method of claim 19, further comprising said at least one shopper also enhancing said at least one shopper's view of said physical merchandise by controlling the position of one or more cameras through which said physical merchandise is viewed.

26. The method of claim 19, wherein interactive viewing of merchandise comprises a shopper viewing merchandise images obtained by at least one of a finger bracket camera, a cap camera, a covert camera, or a camera mounted on a tripod, said camera of whichever type being in physical proximity to the physical merchandise being viewed.

27. The method of claim 19, wherein said at least one sensor communicates with said at least one said seller Purchase Appliance or seller on-site computer by means of at least one of a direct wire, infrared signal transmission, optical signal transmission, or laser signal transmission.

28. The method of claim 19, wherein said at least one sensor is located or operated in a buyer's home.

29. The method of claim 19, further comprising: remotely operating a closed circuit television purchasing system including operating enabled cameras mounted on a track, in a dome, or on a stand, to pan, tilt, or zoom, signals from the cameras being processed or digitally recorded, thereby allowing real-time interactive online viewing of at least one real-time interactive show-room.

30. The method of claim 19, wherein said buyer Purchase Appliance is a buyer Volume Purchase Rebate Investing Appliance, whereby the method further comprises the buyer receiving Volume Purchase Rebate Investing information on Volume purchases of merchandise and/or services.

31. The system of claim 19, wherein said second account of said buyer comprises at least one financial investment instrument, and said second account of said buyer comprises at least one IRA account.

* * * * *